United States Patent
Regev et al.

(10) Patent No.: US 12,531,711 B2
(45) Date of Patent: Jan. 20, 2026

(54) ENHANCED PTRS FOR MITIGATION OF PHASE NOISE

(71) Applicant: QUALCOMM Incorporated, San Diego, CA (US)

(72) Inventors: Aviv Regev, Tel Aviv (IL); Ronen Shaked, Kfar Saba (IL); Yaniv Eistein, Tel Aviv (IL)

(73) Assignee: QUALCOMM Incorporated, San Diego, CA (US)

( * ) Notice: Subject to any disclaimer, the term of this patent is extended or adjusted under 35 U.S.C. 154(b) by 306 days.

(21) Appl. No.: 18/477,448

(22) Filed: Sep. 28, 2023

(65) Prior Publication Data

US 2025/0112751 A1  Apr. 3, 2025

(51) Int. Cl.
*H04L 5/00*  (2006.01)
*H04B 17/21*  (2015.01)

(52) U.S. Cl.
CPC ......... *H04L 5/0098* (2013.01); *H04B 17/221* (2023.05); *H04L 5/0048* (2013.01)

(58) Field of Classification Search
CPC ... H04L 5/0098; H04L 5/0048; H04L 5/0051; H04L 5/0094; H04L 27/261; H04L 27/2675; H04B 17/221
USPC ................................ 370/329; 455/450–452.2
See application file for complete search history.

(56) References Cited

U.S. PATENT DOCUMENTS

| | | | | |
|---|---|---|---|---|
| 2019/0356437 | A1* | 11/2019 | Zhong | H04L 25/0224 |
| 2020/0021412 | A1* | 1/2020 | Xu | H04L 27/261 |
| 2023/0099883 | A1* | 3/2023 | Paz | H04L 1/0003 370/329 |

FOREIGN PATENT DOCUMENTS

| | | |
|---|---|---|
| CN | 109995488 A | 7/2019 |
| EP | 3605924 A1 | 2/2020 |

OTHER PUBLICATIONS

International Search Report and Written Opinion—PCT/US2024/040000—ISA/EPO—Nov. 4, 2024.

* cited by examiner

*Primary Examiner* — Michael Y Mapa
(74) *Attorney, Agent, or Firm* — Procopio, Cory, Hargreaves & Savitch LLP

(57) ABSTRACT

The apparatus may be a wireless device configured to transmit, for a network device, a first indication mapping each of a plurality of residual integrated phase noise powers (RIPNPs) to a corresponding number of subcarriers, receive, based on the first indication, a second indication of a number of subcarriers including a phase tracking reference signal (PTRS), receive, via one or more symbols, a transmission including a data signal and the PTRS over the number of subcarriers indicated in the second indication, and perform a demodulation of the data signal using a phase noise estimation based on the PTRS. The apparatus may be a network device configured to obtain, from a wireless device, the first indication, output, based on the first indication, the second indication, and transmit, via one or more symbols, the transmission including the data signal and the PTRS.

30 Claims, 12 Drawing Sheets

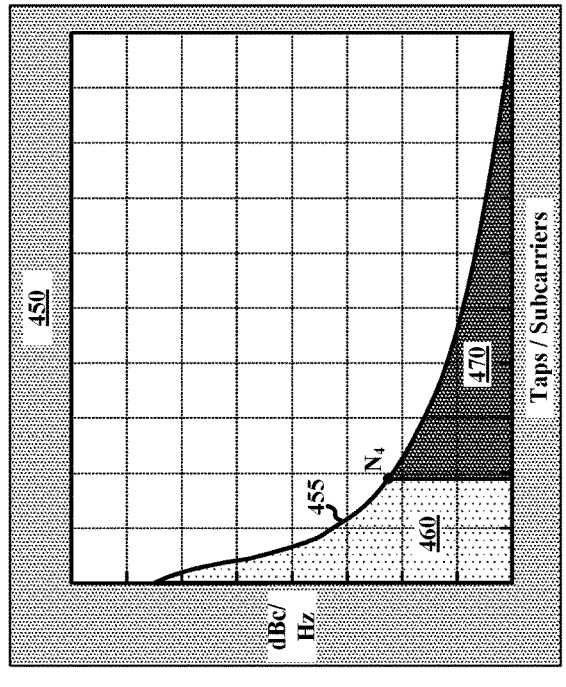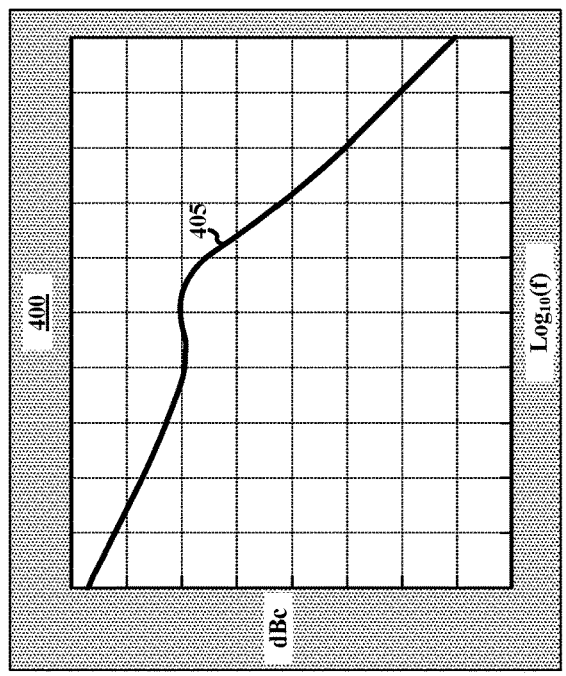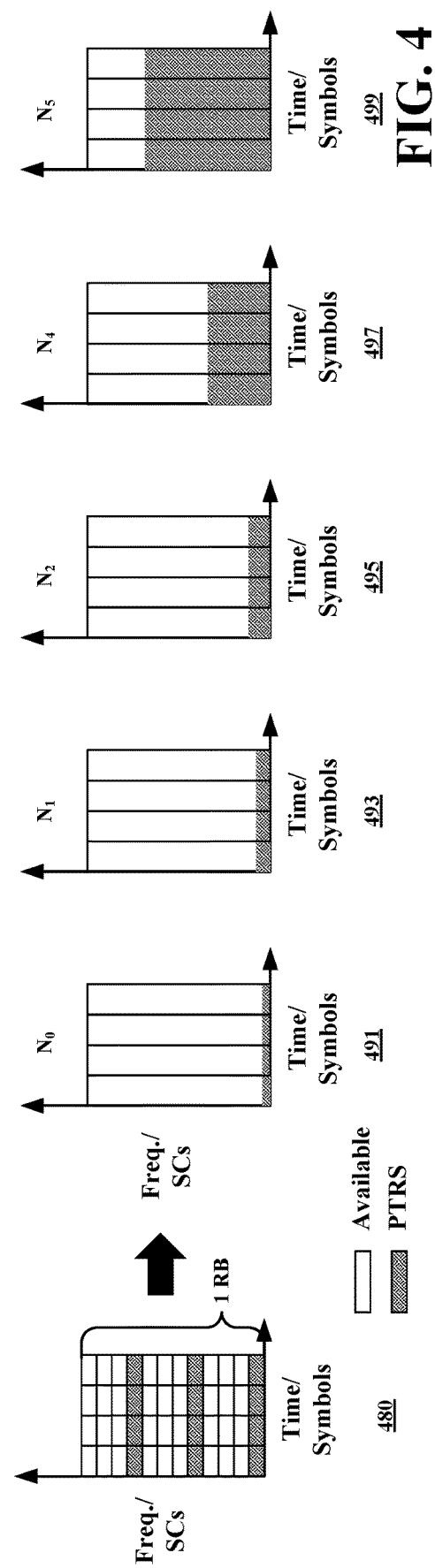
FIG. 4

ENHANCED PTRS FOR MITIGATION OF PHASE NOISE

TECHNICAL FIELD

The present disclosure relates generally to communication systems, and more particularly, to noise mitigation generally and, more specifically, to wireless communication that includes a reference signal for noise mitigation.

Introduction

Wireless communication systems are widely deployed to provide various telecommunication services such as telephony, video, data, messaging, and broadcasts. Typical wireless communication systems may employ multiple-access technologies capable of supporting communication with multiple users by sharing available system resources. Examples of such multiple-access technologies include code division multiple access (CDMA) systems, time division multiple access (TDMA) systems, frequency division multiple access (FDMA) systems, OFDMA systems, single-carrier frequency division multiple access (SC-FDMA) systems, and time division synchronous code division multiple access (TD-SCDMA) systems.

These multiple access technologies have been adopted in various telecommunication standards to provide a common protocol that enables different wireless devices to communicate on a municipal, national, regional, and even global level. An example telecommunication standard is 5G New Radio (NR). 5G NR is part of a continuous mobile broadband evolution promulgated by Third Generation Partnership Project (3GPP) to meet new requirements associated with latency, reliability, security, scalability (e.g., with Internet of Things (IoT)), and other requirements. 5G NR includes services associated with enhanced mobile broadband (eMBB), massive machine type communications (mMTC), and ultra-reliable low latency communications (URLLC). Some aspects of 5G NR may be based on the 4G Long Term Evolution (LTE) standard. There exists a need for further improvements in 5G NR technology. These improvements may also be applicable to other multi-access technologies and the telecommunication standards that employ these technologies.

BRIEF SUMMARY

The following presents a simplified summary of one or more aspects in order to provide a basic understanding of such aspects. This summary is not an extensive overview of all contemplated aspects. This summary neither identifies key or critical elements of all aspects nor delineates the scope of any or all aspects. Its sole purpose is to present some concepts of one or more aspects in a simplified form as a prelude to the more detailed description that is presented later.

For higher order modulation schemes, phase noise (e.g., which may be referred to as PN) may represent a significant component of the overall noise for a downlink signal received at a wireless device (e.g., a UE). The effect of phase noise, in some aspects, increases as the carrier frequency increases. Additionally, the demodulation of higher-order constellations may be based on a higher operational signal to noise ratio (SNR), and the phase noise can reduce an ability to demodulate such higher-order constellations. A phase tracking reference signal (PTRS) can use significant overhead, which can reduce throughput. Aspects presented herein provide for more efficient PTRS, which can also reduce complexity for estimation and cancellation at a receiver. The reduced complexity can provide power savings and reduce latency for demodulation.

In an aspect of the disclosure, a method, a computer-readable medium, and an apparatus are provided. The apparatus may be a wireless device configured to transmit, for a network device, a first indication mapping each of a plurality of residual integrated phase noise powers (RIPNPs) to a corresponding number of subcarriers, receive, based on the first indication, a second indication of a number of subcarriers including a phase tracking reference signal (PTRS), receive, via one or more symbols, a transmission including a data signal and the PTRS over the number of subcarriers indicated in the second indication, and perform a demodulation of the data signal using a phase noise estimation based on the PTRS.

In an aspect of the disclosure, a method, a computer-readable medium, and an apparatus are provided. The apparatus may be a network device configured to obtain, from a wireless device, a first indication mapping each of a plurality of RIPNPs to a corresponding number of subcarriers, output, based on the first indication, a second indication of a number of subcarriers including a PTRS, and transmit, via one or more symbols, a transmission including a data signal and the PTRS over the number of subcarriers indicated in the second indication.

To the accomplishment of the foregoing and related ends, the one or more aspects may include the features hereinafter fully described and particularly pointed out in the claims. The following description and the drawings set forth in detail certain illustrative features of the one or more aspects. These features are indicative, however, of but a few of the various ways in which the principles of various aspects may be employed.

BRIEF DESCRIPTION OF THE DRAWINGS

FIG. 4 includes a first chart illustrating a phase noise power relative to a power of an associated carrier frequency as a function of a frequency offset from the carrier frequency and a second chart illustrating a phase noise power as a function of subcarriers used to carry PTRS for a particular SCS.

DETAILED DESCRIPTION

Figure 1:
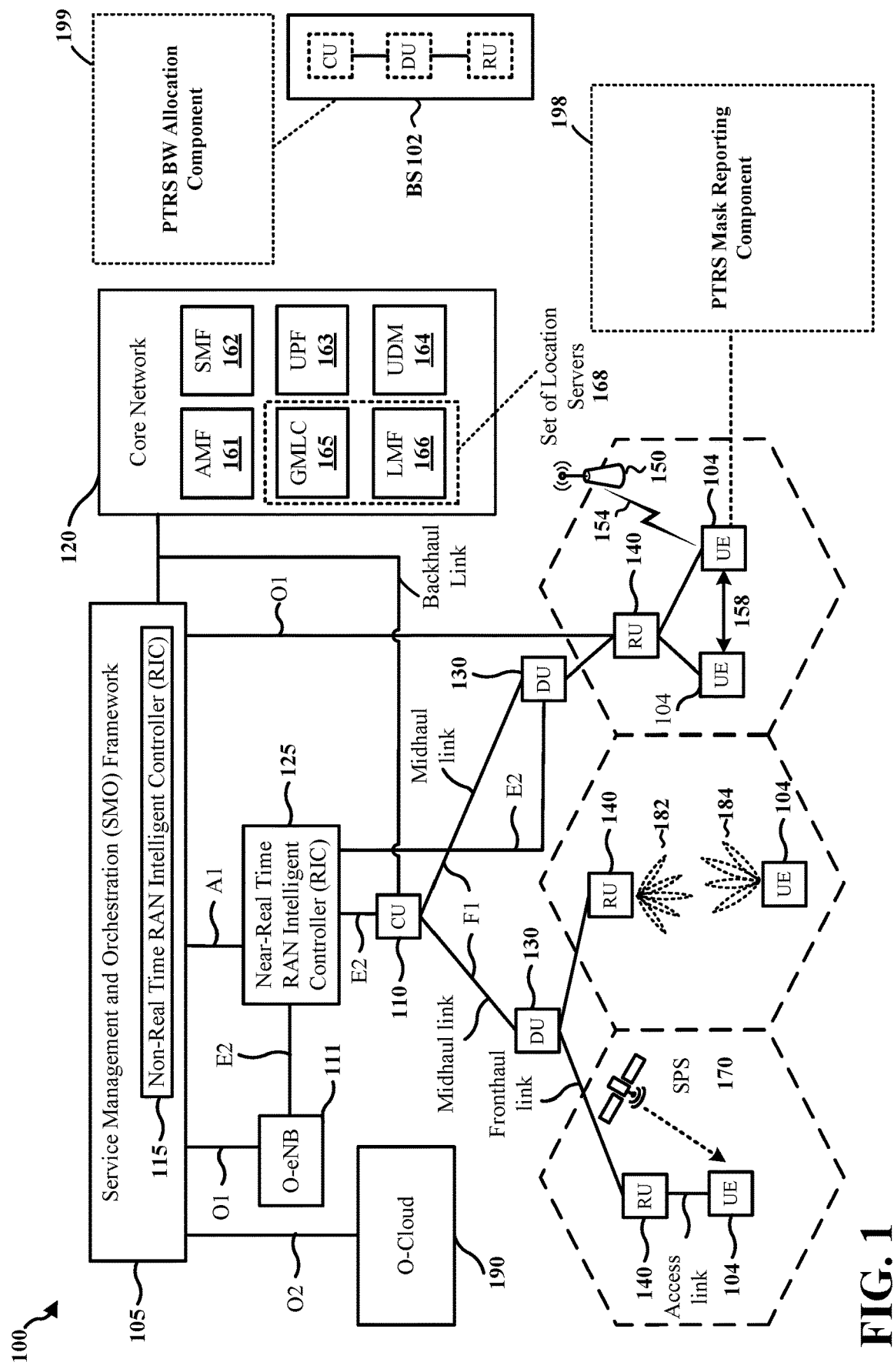
FIG. 1 is a diagram illustrating an example of a wireless communications system and an access network.

For higher order modulation schemes, phase noise (e.g., which may be referred to as PN) may represent a significant component of the overall noise for a downlink signal received at a wireless device (e.g., a UE). The effect of phase noise, in some aspects, increases as the carrier frequency increases. For example, because the phase noise, in some aspects, is generated due to an unsynchronized phase-locked loop (PLL), as the frequency increases, the inaccurate timing of the PLL (e.g., an asynchronization) becomes more dominant with respect to the carrier, or used, frequency. The phase noise mitigation at a wireless device configured for lower-order modulation (e.g., quadrature amplitude modulation (QAM) up to 256-QAM) may not be sufficient for higher-order modulation (e.g., 4K-QAM, or 16K-QAM). To enable the demodulation of such higher-order constellations, the operational signal to noise ratio (SNR) should be very high. Thus, in some aspects, the phase noise may become the limiting noise floor if it remains untreated and wireless devices (e.g., receivers) may be configured to cancel or otherwise account for phase noise.

A first configuration of PTRS that is non-continuous in a frequency domain (e.g., a PTRS configuration in non-contiguous frequency resources, such as including one PTRS in each resource block in a time-and-frequency domain, in some aspects, may allow the mitigation of a constant phase noise (e.g., based on a constant phase noise estimation). The phase noise, in some aspects, includes varying contributions from a wide range of frequencies around a central (or carrier) frequency and, in a second PTRS configuration, a continuous PTRS (in the frequency domain) may be used to estimate the phase noise across the range of frequencies for phase noise mitigation. While a wide range of frequencies may contribute to the phase noise, the contributions tend to decrease at larger frequency offsets and the result of ignoring those larger frequency offsets (e.g., a maximum power associated with the omitted frequency offsets) may be described and/or defined as a RIPNP. Therefore, while a phase noise estimation (and cancellation) may be improved by considering a larger range of frequencies (e.g., transmitting a PTRS over a larger number of subcarriers), the larger range of frequencies (e.g., the larger number of subcarriers) may be associated with increased overhead, power consumption, complexity, and latency. Accordingly, the range of frequencies used and/or the number of subcarriers including a PTRS may be selected based on a threshold phase noise estimation accuracy (e.g., a threshold for a maximum phase noise that is not identified by the estimation), a threshold overhead, a threshold power consumption, and/or a threshold latency depending on the characteristics of the communication, characteristics of the wireless device(s), or other considerations.

The detailed description set forth below in connection with the drawings describes various configurations and does not represent the only configurations in which the concepts described herein may be practiced. The detailed description includes specific details for the purpose of providing a thorough understanding of various concepts. However, these concepts may be practiced without these specific details. In some instances, well known structures and components are shown in block diagram form in order to avoid obscuring such concepts.

Several aspects of telecommunication systems are presented with reference to various apparatus and methods. These apparatus and methods are described in the following detailed description and illustrated in the accompanying drawings by various blocks, components, circuits, processes, algorithms, etc. (collectively referred to as "elements"). These elements may be implemented using electronic hardware, computer software, or any combination thereof. Whether such elements are implemented as hardware or software depends upon the particular application and design constraints imposed on the overall system.

By way of example, an element, or any portion of an element, or any combination of elements may be implemented as a "processing system" that includes one or more processors. When multiple processors are implemented, the multiple processors may perform the functions individually or in combination. Examples of processors include microprocessors, microcontrollers, graphics processing units (GPUs), central processing units (CPUs), application processors, digital signal processors (DSPs), reduced instruction set computing (RISC) processors, systems on a chip (SoC), baseband processors, field programmable gate arrays (FPGAs), programmable logic devices (PLDs), state machines, gated logic, discrete hardware circuits, and other suitable hardware configured to perform the various functionality described throughout this disclosure. One or more processors in the processing system may execute software. Software, whether referred to as software, firmware, middleware, microcode, hardware description language, or otherwise, shall be construed broadly to mean instructions, instruction sets, code, code segments, program code, programs, subprograms, software components, applications, software applications, software packages, routines, subroutines, objects, executables, threads of execution, procedures, functions, or any combination thereof.

Accordingly, in one or more example aspects, implementations, and/or use cases, the functions described may be implemented in hardware, software, or any combination thereof. If implemented in software, the functions may be stored on or encoded as one or more instructions or code on a computer-readable medium. Computer-readable media includes computer storage media. Storage media may be any available media that can be accessed by a computer. By way of example, such computer-readable media can include a random-access memory (RAM), a read-only memory (ROM), an electrically erasable programmable ROM (EEPROM), optical disk storage, magnetic disk storage, other magnetic storage devices, combinations of the types of computer-readable media, or any other medium that can be used to store computer executable code in the form of instructions or data structures that can be accessed by a computer.

While aspects, implementations, and/or use cases are described in this application by illustration to some examples, additional or different aspects, implementations and/or use cases may come about in many different arrangements and scenarios. Aspects, implementations, and/or use cases described herein may be implemented across many differing platform types, devices, systems, shapes, sizes, and packaging arrangements. For example, aspects, implementations, and/or use cases may come about via integrated chip implementations and other non-module-component based devices (e.g., end-user devices, vehicles, communication devices, computing devices, industrial equipment, retail/purchasing devices, medical devices, artificial intelligence (AI)-enabled devices, etc.). While some examples may or may not be specifically directed to use cases or applications, a wide assortment of applicability of described examples may occur. Aspects, implementations, and/or use cases may range a spectrum from chip-level or modular components to non-modular, non-chip-level implementations and further to aggregate, distributed, or original equipment manufacturer (OEM) devices or systems incorporating one or more techniques herein. In some practical settings, devices incorporating described aspects and features may also include additional components and features for implementation and practice of claimed and described aspect. For example, transmission and reception of wireless signals necessarily includes a number of components for analog and digital purposes (e.g., hardware components including antenna, RF-chains, power amplifiers, modulators, buffer, processor (s), interleaver, adders/summers, etc.). Techniques described herein may be practiced in a wide variety of devices, chip-level components, systems, distributed arrangements, aggregated or disaggregated components, end-user devices, etc. of varying sizes, shapes, and constitution.

Deployment of communication systems, such as 5G NR systems, may be arranged in multiple manners with various components or constituent parts. In a 5G NR system, or network, a network node, a network entity, a mobility element of a network, a radio access network (RAN) node, a core network node, a network element, or a network equipment, such as a base station (BS), or one or more units (or one or more components) performing base station functionality, may be implemented in an aggregated or disaggregated architecture. For example, a BS (such as a Node B (NB), evolved NB (eNB), NR BS, 5G NB, access point (AP), a transmission reception point (TRP), or a cell, etc.) may be implemented as an aggregated base station (also known as a standalone BS or a monolithic BS) or a disaggregated base station.

An aggregated base station may be configured to utilize a radio protocol stack that is physically or logically integrated within a single RAN node. A disaggregated base station may be configured to utilize a protocol stack that is physically or logically distributed among two or more units (such as one or more central or centralized units (CUs), one or more distributed units (DUs), or one or more radio units (RUs)). In some aspects, a CU may be implemented within a RAN node, and one or more DUs may be co-located with the CU, or alternatively, may be geographically or virtually distributed throughout one or multiple other RAN nodes. The DUs may be implemented to communicate with one or more RUs. Each of the CU, DU and RU can be implemented as virtual units, i.e., a virtual central unit (VCU), a virtual distributed unit (VDU), or a virtual radio unit (VRU).

Base station operation or network design may consider aggregation characteristics of base station functionality. For example, disaggregated base stations may be utilized in an integrated access backhaul (IAB) network, an open radio access network (O-RAN (such as the network configuration sponsored by the O-RAN Alliance)), or a virtualized radio access network (vRAN, also known as a cloud radio access network (C-RAN)). Disaggregation may include distributing functionality across two or more units at various physical locations, as well as distributing functionality for at least one unit virtually, which can enable flexibility in network design. The various units of the disaggregated base station, or disaggregated RAN architecture, can be configured for wired or wireless communication with at least one other unit.

FIG. 1 is a diagram 100 illustrating an example of a wireless communications system and an access network. The illustrated wireless communications system includes a disaggregated base station architecture. The disaggregated base station architecture may include one or more CUs 110 that can communicate directly with a core network 120 via a backhaul link, or indirectly with the core network 120 through one or more disaggregated base station units (such as a Near-Real Time (Near-RT) RAN Intelligent Controller (RIC) 125 via an E2 link, or a Non-Real Time (Non-RT) RIC 115 associated with a Service Management and Orchestration (SMO) Framework 105, or both). A CU 110 may communicate with one or more DUs 130 via respective midhaul links, such as an F1 interface. The DUs 130 may communicate with one or more RUs 140 via respective fronthaul links. The RUs 140 may communicate with respective UEs 104 via one or more radio frequency (RF) access links. In some implementations, the UE 104 may be simultaneously served by multiple RUs 140.

Each of the units, i.e., the CUs 110, the DUs 130, the RUs 140, as well as the Near-RT RICs 125, the Non-RT RICs 115, and the SMO Framework 105, may include one or more interfaces or be coupled to one or more interfaces configured to receive or to transmit signals, data, or information (collectively, signals) via a wired or wireless transmission medium. Each of the units, or an associated processor or controller providing instructions to the communication interfaces of the units, can be configured to communicate with one or more of the other units via the transmission medium. For example, the units can include a wired interface configured to receive or to transmit signals over a wired transmission medium to one or more of the other units. Additionally, the units can include a wireless interface, which may include a receiver, a transmitter, or a transceiver (such as an RF transceiver), configured to receive or to transmit signals, or both, over a wireless transmission medium to one or more of the other units.

In some aspects, the CU 110 may host one or more higher layer control functions. Such control functions can include radio resource control (RRC), packet data convergence protocol (PDCP), service data adaptation protocol (SDAP), or the like. Each control function can be implemented with an interface configured to communicate signals with other control functions hosted by the CU 110. The CU 110 may be configured to handle user plane functionality (i.e., Central Unit-User Plane (CU-UP)), control plane functionality (i.e., Central Unit-Control Plane (CU-CP)), or a combination thereof. In some implementations, the CU 110 can be logically split into one or more CU-UP units and one or more CU-CP units. The CU-UP unit can communicate bidirectionally with the CU-CP unit via an interface, such as an E1 interface when implemented in an O-RAN configuration. The CU 110 can be implemented to communicate with the DU 130, as necessary, for network control and signaling.

The DU 130 may correspond to a logical unit that includes one or more base station functions to control the operation of one or more RUs 140. In some aspects, the DU 130 may host one or more of a radio link control (RLC) layer, a medium access control (MAC) layer, and one or more high physical (PHY) layers (such as modules for forward error correction (FEC) encoding and decoding, scrambling, modulation, demodulation, or the like) depending, at least in part, on a functional split, such as those defined by 3GPP. In some aspects, the DU 130 may further host one or more low PHY layers. Each layer (or module) can be implemented with an interface configured to communicate signals with other layers (and modules) hosted by the DU 130, or with the control functions hosted by the CU 110.

Lower-layer functionality can be implemented by one or more RUs 140. In some deployments, an RU 140, controlled by a DU 130, may correspond to a logical node that hosts RF processing functions, or low-PHY layer functions (such as performing fast Fourier transform (FFT), inverse FFT (iFFT), digital beamforming, physical random access channel (PRACH) extraction and filtering, or the like), or both, based at least in part on the functional split, such as a lower layer functional split. In such an architecture, the RU(s) 140 can be implemented to handle over the air (OTA) communication with one or more UEs 104. In some implementations, real-time and non-real-time aspects of control and user plane communication with the RU(s) 140 can be controlled by the corresponding DU 130. In some scenarios, this configuration can enable the DU(s) 130 and the CU 110 to be implemented in a cloud-based RAN architecture, such as a vRAN architecture.

The SMO Framework 105 may be configured to support RAN deployment and provisioning of non-virtualized and virtualized network elements. For non-virtualized network elements, the SMO Framework 105 may be configured to support the deployment of dedicated physical resources for RAN coverage requirements that may be managed via an operations and maintenance interface (such as an O1 interface). For virtualized network elements, the SMO Framework 105 may be configured to interact with a cloud computing platform (such as an open cloud (O-Cloud) 190) to perform network element life cycle management (such as to instantiate virtualized network elements) via a cloud computing platform interface (such as an O2 interface). Such virtualized network elements can include, but are not limited to, CUs 110, DUs 130, RUs 140 and Near-RT RICs 125. In some implementations, the SMO Framework 105 can communicate with a hardware aspect of a 4G RAN, such as an open eNB (O-eNB) 111, via an O1 interface. Additionally, in some implementations, the SMO Framework 105 can communicate directly with one or more RUs 140 via an O1 interface. The SMO Framework 105 also may include a Non-RT RIC 115 configured to support functionality of the SMO Framework 105.

The Non-RT RIC 115 may be configured to include a logical function that enables non-real-time control and optimization of RAN elements and resources, artificial intelligence (AI)/machine learning (ML) (AI/ML) workflows including model training and updates, or policy-based guidance of applications/features in the Near-RT RIC 125. The Non-RT RIC 115 may be coupled to or communicate with (such as via an A1 interface) the Near-RT RIC 125. The Near-RT RIC 125 may be configured to include a logical function that enables near-real-time control and optimization of RAN elements and resources via data collection and actions over an interface (such as via an E2 interface) connecting one or more CUs 110, one or more DUs 130, or both, as well as an O-eNB, with the Near-RT RIC 125.

In some implementations, to generate AI/ML models to be deployed in the Near-RT RIC 125, the Non-RT RIC 115 may receive parameters or external enrichment information from external servers. Such information may be utilized by the Near-RT RIC 125 and may be received at the SMO Framework 105 or the Non-RT RIC 115 from non-network data sources or from network functions. In some examples, the Non-RT RIC 115 or the Near-RT RIC 125 may be configured to tune RAN behavior or performance. For example, the Non-RT RIC 115 may monitor long-term trends and patterns for performance and employ AI/ML models to perform corrective actions through the SMO Framework 105 (such as reconfiguration via O1) or via creation of RAN management policies (such as A1 policies).

At least one of the CU 110, the DU 130, and the RU 140 may be referred to as a base station 102. Accordingly, a base station 102 may include one or more of the CU 110, the DU 130, and the RU 140 (each component indicated with dotted lines to signify that each component may or may not be included in the base station 102). The base station 102 provides an access point to the core network 120 for a UE 104. The base station 102 may include macrocells (high power cellular base station) and/or small cells (low power cellular base station). The small cells include femtocells, picocells, and microcells. A network that includes both small cell and macrocells may be known as a heterogeneous network. A heterogeneous network may also include Home Evolved Node Bs (eNBs) (HeNBs), which may provide service to a restricted group known as a closed subscriber group (CSG). The communication links between the RUs 140 and the UEs 104 may include uplink (UL) (also referred to as reverse link) transmissions from a UE 104 to an RU 140 and/or downlink (DL) (also referred to as forward link) transmissions from an RU 140 to a UE 104. The communication links may use multiple-input and multiple-output (MIMO) antenna technology, including spatial multiplexing, beamforming, and/or transmit diversity. The communication links may be through one or more carriers. The base station 102/UEs 104 may use spectrum up to Y MHz (e.g., 5, 10, 15, 20, 100, 400, etc. MHz) bandwidth per carrier allocated in a carrier aggregation of up to a total of Yx MHz (x component carriers) used for transmission in each direction. The carriers may or may not be adjacent to each other. Allocation of carriers may be asymmetric with respect to DL and UL (e.g., more or fewer carriers may be allocated for DL than for UL). The component carriers may include a primary component carrier and one or more secondary component carriers. A primary component carrier may be referred to as a primary cell (PCell) and a secondary component carrier may be referred to as a secondary cell (SCell).

Certain UEs 104 may communicate with each other using device-to-device (D2D) communication link 158. The D2D communication link 158 may use the DL/UL wireless wide area network (WWAN) spectrum. The D2D communication link 158 may use one or more sidelink channels, such as a physical sidelink broadcast channel (PSBCH), a physical sidelink discovery channel (PSDCH), a physical sidelink shared channel (PSSCH), and a physical sidelink control channel (PSCCH). D2D communication may be through a variety of wireless D2D communications systems, such as for example, Bluetooth™ (Bluetooth is a trademark of the Bluetooth Special Interest Group (SIG)), Wi-Fi™ (Wi-Fi is a trademark of the Wi-Fi Alliance) based on the Institute of Electrical and Electronics Engineers (IEEE) 802.11 standard, LTE, or NR.

The wireless communications system may further include a Wi-Fi AP 150 in communication with UEs 104 (also referred to as Wi-Fi stations (STAs)) via communication link 154, e.g., in a 5 GHz unlicensed frequency spectrum or the like. When communicating in an unlicensed frequency spectrum, the UEs 104/AP 150 may perform a clear channel assessment (CCA) prior to communicating in order to determine whether the channel is available.

The electromagnetic spectrum is often subdivided, based on frequency/wavelength, into various classes, bands, channels, etc. In 5G NR, two initial operating bands have been identified as frequency range designations FR1 (410 MHz-7.125 GHz) and FR2 (24.25 GHz-52.6 GHz). Although a portion of FR1 is greater than 6 GHz, FR1 is often referred to (interchangeably) as a "sub-6 GHz" band in various documents and articles. A similar nomenclature issue sometimes occurs with regard to FR2, which is often referred to (interchangeably) as a "millimeter wave" band in documents and articles, despite being different from the extremely high frequency (EHF) band (30 GHz-300 GHz) which is identified by the International Telecommunications Union (ITU) as a "millimeter wave" band.

The frequencies between FR1 and FR2 are often referred to as mid-band frequencies. Recent 5G NR studies have identified an operating band for these mid-band frequencies as frequency range designation FR3 (7.125 GHz-24.25 GHz). Frequency bands falling within FR3 may inherit FR1 characteristics and/or FR2 characteristics, and thus may effectively extend features of FR1 and/or FR2 into mid-band frequencies. In addition, higher frequency bands are currently being explored to extend 5G NR operation beyond 52.6 GHz. For example, three higher operating bands have been identified as frequency range designations FR2-2 (52.6 GHz-71 GHz), FR4 (71 GHz-114.25 GHz), and FR5 (114.25 GHz-300 GHz). Each of these higher frequency bands falls within the EHF band.

With the above aspects in mind, unless specifically stated otherwise, the term "sub-6 GHz" or the like if used herein may broadly represent frequencies that may be less than 6 GHz, may be within FR1, or may include mid-band frequencies. Further, unless specifically stated otherwise, the term "millimeter wave" or the like if used herein may broadly represent frequencies that may include mid-band frequencies, may be within FR2, FR4, FR2-2, and/or FR5, or may be within the EHF band.

The base station 102 and the UE 104 may each include a plurality of antennas, such as antenna elements, antenna panels, and/or antenna arrays to facilitate beamforming. The base station 102 may transmit a beamformed signal 182 to the UE 104 in one or more transmit directions. The UE 104 may receive the beamformed signal from the base station 102 in one or more receive directions. The UE 104 may also transmit a beamformed signal 184 to the base station 102 in one or more transmit directions. The base station 102 may receive the beamformed signal from the UE 104 in one or more receive directions. The base station 102/UE 104 may perform beam training to determine the best receive and transmit directions for each of the base station 102/UE 104. The transmit and receive directions for the base station 102 may or may not be the same. The transmit and receive directions for the UE 104 may or may not be the same.

The base station 102 may include and/or be referred to as a gNB, Node B, eNB, an access point, a base transceiver station, a radio base station, a radio transceiver, a transceiver function, a basic service set (BSS), an extended service set (ESS), a TRP, network node, network entity, network equipment, or some other suitable terminology. The base station 102 can be implemented as an integrated access and backhaul (IAB) node, a relay node, a sidelink node, an aggregated (monolithic) base station with a baseband unit (BBU) (including a CU and a DU) and an RU, or as a disaggregated base station including one or more of a CU, a DU, and/or an RU. The set of base stations, which may include disaggregated base stations and/or aggregated base stations, may be referred to as next generation (NG) RAN (NG-RAN).

The core network 120 may include an Access and Mobility Management Function (AMF) 161, a Session Management Function (SMF) 162, a User Plane Function (UPF) 163, a Unified Data Management (UDM) 164, one or more location servers 168, and other functional entities. The AMF 161 is the control node that processes the signaling between the UEs 104 and the core network 120. The AMF 161 supports registration management, connection management, mobility management, and other functions. The SMF 162 supports session management and other functions. The UPF 163 supports packet routing, packet forwarding, and other functions. The UDM 164 supports the generation of authentication and key agreement (AKA) credentials, user identification handling, access authorization, and subscription management. The one or more location servers 168 are illustrated as including a Gateway Mobile Location Center (GMLC) 165 and a Location Management Function (LMF) 166. However, generally, the one or more location servers 168 may include one or more location/positioning servers, which may include one or more of the GMLC 165, the LMF 166, a position determination entity (PDE), a serving mobile location center (SMLC), a mobile positioning center (MPC), or the like. The GMLC 165 and the LMF 166 support UE location services. The GMLC 165 provides an interface for clients/applications (e.g., emergency services) for accessing UE positioning information. The LMF 166 receives measurements and assistance information from the NG-RAN and the UE 104 via the AMF 161 to compute the position of the UE 104. The NG-RAN may utilize one or more positioning methods in order to determine the position of the UE 104. Positioning the UE 104 may involve signal measurements, a position estimate, and an optional velocity computation based on the measurements. The signal measurements may be made by the UE 104 and/or the base station 102 serving the UE 104. The signals measured may be based on one or more of a satellite positioning system (SPS) 170 (e.g., one or more of a Global Navigation Satellite System (GNSS), global position system (GPS), non-terrestrial network (NTN), or other satellite position/location system), LTE signals, wireless local area network (WLAN) signals, Bluetooth signals, a terrestrial beacon system (TBS), sensor-based information (e.g., barometric pressure sensor, motion sensor), NR enhanced cell ID (NR E-CID) methods, NR signals (e.g., multi-round trip time (Multi-RTT), DL angle-of-departure (DL-AoD), DL time difference of arrival (DL-TDOA), UL time difference of arrival (UL-TDOA), and UL angle-of-arrival (UL-AoA) positioning), and/or other systems/signals/sensors.

Examples of UEs 104 include a cellular phone, a smart phone, a session initiation protocol (SIP) phone, a laptop, a personal digital assistant (PDA), a satellite radio, a global positioning system, a multimedia device, a video device, a digital audio player (e.g., MP3 player), a camera, a game console, a tablet, a smart device, a wearable device, a vehicle, an electric meter, a gas pump, a large or small kitchen appliance, a healthcare device, an implant, a sensor/actuator, a display, or any other similar functioning device. Some of the UEs 104 may be referred to as IoT devices (e.g., parking meter, gas pump, toaster, vehicles, heart monitor, etc.). The UE 104 may also be referred to as a station, a mobile station, a subscriber station, a mobile unit, a subscriber unit, a wireless unit, a remote unit, a mobile device, a wireless device, a wireless communications device, a remote device, a mobile subscriber station, an access terminal, a mobile terminal, a wireless terminal, a remote terminal, a handset, a user agent, a mobile client, a client, or some other suitable terminology. In some scenarios, the term UE may also apply to one or more companion devices such as in a device constellation arrangement. One or more of these devices may collectively access the network and/or individually access the network.

Referring again to FIG. 1, in certain aspects, the UE 104 may have a PTRS mask reporting component 198 that may be configured to transmit, for a network device, a first indication mapping a RIPNP to a corresponding number of subcarriers, receive, based on the first indication, a second indication of a number of subcarriers including a PTRS, receive, via one or more symbols, a transmission including a data signal and the PTRS over the number of subcarriers indicated in the second indication, and perform a demodulation of the data signal using a phase noise estimation based on the PTRS. In certain aspects, the base station 102 may have a PTRS BW allocation component 199 that may be configured to obtain, from a wireless device, a first indication mapping each of a plurality of RIPNPs to a corresponding number of subcarriers, output, based on the first indication, a second indication of a number of subcarriers including a PTRS, and transmit, via one or more symbols, a transmission including a data signal and the PTRS over the number of subcarriers indicated in the second indication. Although the following description may be focused on 5G NR, the concepts described herein may be applicable to other similar areas, such as LTE, LTE-A, CDMA, GSM, and other wireless technologies.

Figure 2:
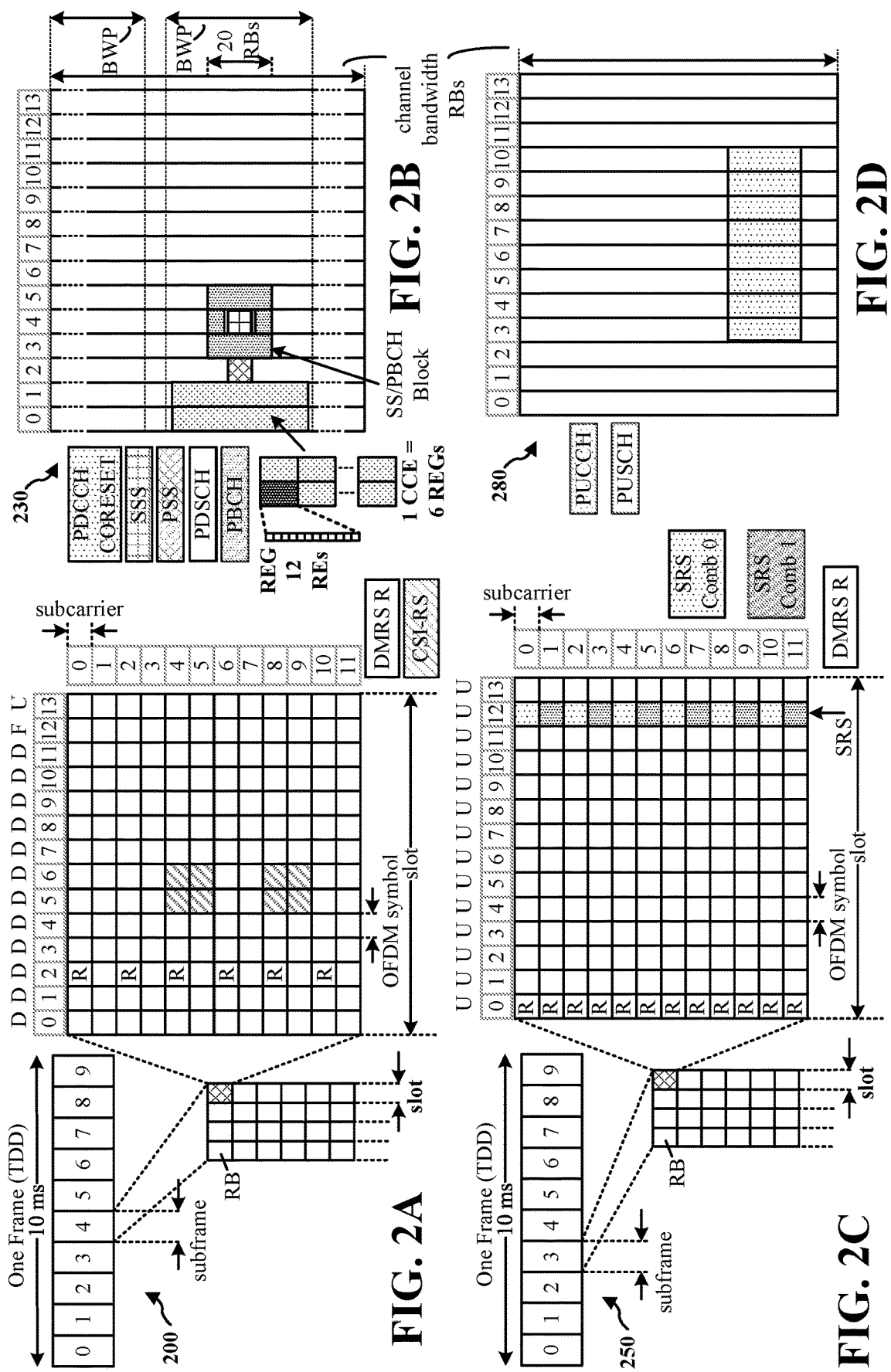
FIG. 2A is a diagram illustrating an example of a first frame, in accordance with various aspects of the present disclosure.
FIG. 2B is a diagram illustrating an example of downlink (DL) channels within a subframe, in accordance with various aspects of the present disclosure.
FIG. 2C is a diagram illustrating an example of a second frame, in accordance with various aspects of the present disclosure.
FIG. 2D is a diagram illustrating an example of uplink (UL) channels within a subframe, in accordance with various aspects of the present disclosure.

FIG. 2A is a diagram 200 illustrating an example of a first subframe within a 5G NR frame structure. FIG. 2B is a diagram 230 illustrating an example of DL channels within a 5G NR subframe. FIG. 2C is a diagram 250 illustrating an example of a second subframe within a 5G NR frame structure. FIG. 2D is a diagram 280 illustrating an example of UL channels within a 5G NR subframe. The 5G NR frame structure may be frequency division duplexed (FDD) in which for a particular set of subcarriers (carrier system bandwidth), subframes within the set of subcarriers are dedicated for either DL or UL, or may be time division duplexed (TDD) in which for a particular set of subcarriers (carrier system bandwidth), subframes within the set of subcarriers are dedicated for both DL and UL. In the examples provided by FIGS. 2A, 2C, the 5G NR frame structure is assumed to be TDD, with subframe 4 being configured with slot format 28 (with mostly DL), where D is DL, U is UL, and F is flexible for use between DL/UL, and subframe 3 being configured with slot format 1 (with all UL). While subframes 3, 4 are shown with slot formats 1, 28, respectively, any particular subframe may be configured with any of the various available slot formats 0-61. Slot formats 0, 1 are all DL, UL, respectively. Other slot formats 2-61 include a mix of DL, UL, and flexible symbols. UEs are configured with the slot format (dynamically through DL control information (DCI), or semi-statically/statically through radio resource control (RRC) signaling) through a received slot format indicator (SFI). Note that the description infra applies also to a 5G NR frame structure that is TDD.

FIGS. 2A-2D illustrate a frame structure, and the aspects of the present disclosure may be applicable to other wireless communication technologies, which may have a different frame structure and/or different channels. A frame (10 ms) may be divided into 10 equally sized subframes (1 ms). Each subframe may include one or more time slots. Subframes may also include mini-slots, which may include 7, 4, or 2 symbols. Each slot may include 14 or 12 symbols, depending on whether the cyclic prefix (CP) is normal or extended. For normal CP, each slot may include 14 symbols, and for extended CP, each slot may include 12 symbols. The symbols on DL may be CP orthogonal frequency division multiplexing (OFDM) (CP-OFDM) symbols. The symbols on UL may be CP-OFDM symbols (for high throughput scenarios) or discrete Fourier transform (DFT) spread OFDM (DFT-s-OFDM) symbols (for power limited scenarios; limited to a single stream transmission). The number of slots within a subframe is based on the CP and the numerology. The numerology defines the subcarrier spacing (SCS) (see Table 1). The symbol length/duration may scale with 1/SCS.

TABLE 1

Numerology, SCS, and CP

| $\mu$ | SCS $\Delta f = 2^{\mu} \cdot 15 [kHz]$ | Cyclic prefix |
| --- | --- | --- |
| 0 | 15 | Normal |
| 1 | 30 | Normal |
| 2 | 60 | Normal, Extended |
| 3 | 120 | Normal |
| 4 | 240 | Normal |
| 5 | 480 | Normal |
| 6 | 960 | Normal |

For normal CP (14 symbols/slot), different numerologies $\mu$ 0 to 4 allow for 1, 2, 4, 8, and 16 slots, respectively, per subframe. For extended CP, the numerology 2 allows for 4 slots per subframe. Accordingly, for normal CP and numerology $\mu$, there are 14 symbols/slot and $2^{\mu}$ slots/subframe. The subcarrier spacing may be equal to $2^{\mu}*15$ kHz, where $\mu$ is the numerology 0 to 4. As such, the numerology $\mu=0$ has a subcarrier spacing of 15 kHz and the numerology $\mu=4$ has a subcarrier spacing of 240 kHz. The symbol length/duration is inversely related to the subcarrier spacing. FIGS. 2A-2D provide an example of normal CP with 14 symbols per slot and numerology $\mu=2$ with 4 slots per subframe. The slot duration is 0.25 ms, the subcarrier spacing is 60 kHz, and the symbol duration is approximately 16.67 $\mu$s. Within a set of frames, there may be one or more different bandwidth parts (BWPs) (see FIG. 2B) that are frequency division multiplexed. Each BWP may have a particular numerology and CP (normal or extended).

A resource grid may be used to represent the frame structure. Each time slot includes a resource block (RB) (also referred to as physical RBs (PRBs)) that extends 12 consecutive subcarriers. The resource grid is divided into multiple resource elements (REs). The number of bits carried by each RE depends on the modulation scheme.

As illustrated in FIG. 2A, some of the REs carry reference (pilot) signals (RS) for the UE. The RS may include demodulation RS (DM-RS) (indicated as R for one particular configuration, but other DM-RS configurations are possible) and channel state information reference signals (CSI-RS) for channel estimation at the UE. The RS may also include beam measurement RS (BRS), beam refinement RS (BRRS), and phase tracking RS (PT-RS).

FIG. 2B illustrates an example of various DL channels within a subframe of a frame. The physical downlink control channel (PDCCH) carries DCI within one or more control channel elements (CCEs) (e.g., 1, 2, 4, 8, or 16 CCEs), each CCE including six RE groups (REGs), each REG including 12 consecutive REs in an OFDM symbol of an RB. A PDCCH within one BWP may be referred to as a control resource set (CORESET). A UE is configured to monitor PDCCH candidates in a PDCCH search space (e.g., common search space, UE-specific search space) during PDCCH monitoring occasions on the CORESET, where the PDCCH candidates have different DCI formats and different aggregation levels. Additional BWPs may be located at greater and/or lower frequencies across the channel bandwidth. A primary synchronization signal (PSS) may be within symbol 2 of particular subframes of a frame. The PSS is used by a UE 104 to determine subframe/symbol timing and a physical layer identity. A secondary synchronization signal (SSS) may be within symbol 4 of particular subframes of a frame. The SSS is used by a UE to determine a physical layer cell identity group number and radio frame timing. Based on the physical layer identity and the physical layer cell identity group number, the UE can determine a physical cell identifier (PCI). Based on the PCI, the UE can determine the locations of the DM-RS. The physical broadcast channel (PBCH), which carries a master information block (MIB), may be logically grouped with the PSS and SSS to form a synchronization signal (SS)/PBCH block (also referred to as SS block (SSB)). The MIB provides a number of RBs in the system bandwidth and a system frame number (SFN). The physical downlink shared channel (PDSCH) carries user data, broadcast system information not transmitted through the PBCH such as system information blocks (SIBs), and paging messages.

As illustrated in FIG. 2C, some of the REs carry DM-RS (indicated as R for one particular configuration, but other DM-RS configurations are possible) for channel estimation at the base station. The UE may transmit DM-RS for the physical uplink control channel (PUCCH) and DM-RS for the physical uplink shared channel (PUSCH). The PUSCH DM-RS may be transmitted in the first one or two symbols of the PUSCH. The PUCCH DM-RS may be transmitted in different configurations depending on whether short or long PUCCHs are transmitted and depending on the particular PUCCH format used. The UE may transmit sounding reference signals (SRS). The SRS may be transmitted in the last symbol of a subframe. The SRS may have a comb structure, and a UE may transmit SRS on one of the combs. The SRS may be used by a base station for channel quality estimation to enable frequency-dependent scheduling on the UL.

FIG. 2D illustrates an example of various UL channels within a subframe of a frame. The PUCCH may be located as indicated in one configuration. The PUCCH carries uplink control information (UCI), such as scheduling requests, a channel quality indicator (CQI), a precoding matrix indicator (PMI), a rank indicator (RI), and hybrid automatic repeat request (HARQ) acknowledgment (ACK) (HARQ-ACK) feedback (i.e., one or more HARQ ACK bits indicating one or more ACK and/or negative ACK (NACK)). The PUSCH carries data, and may additionally be used to carry a buffer status report (BSR), a power headroom report (PHR), and/or UCI.

Figure 3:
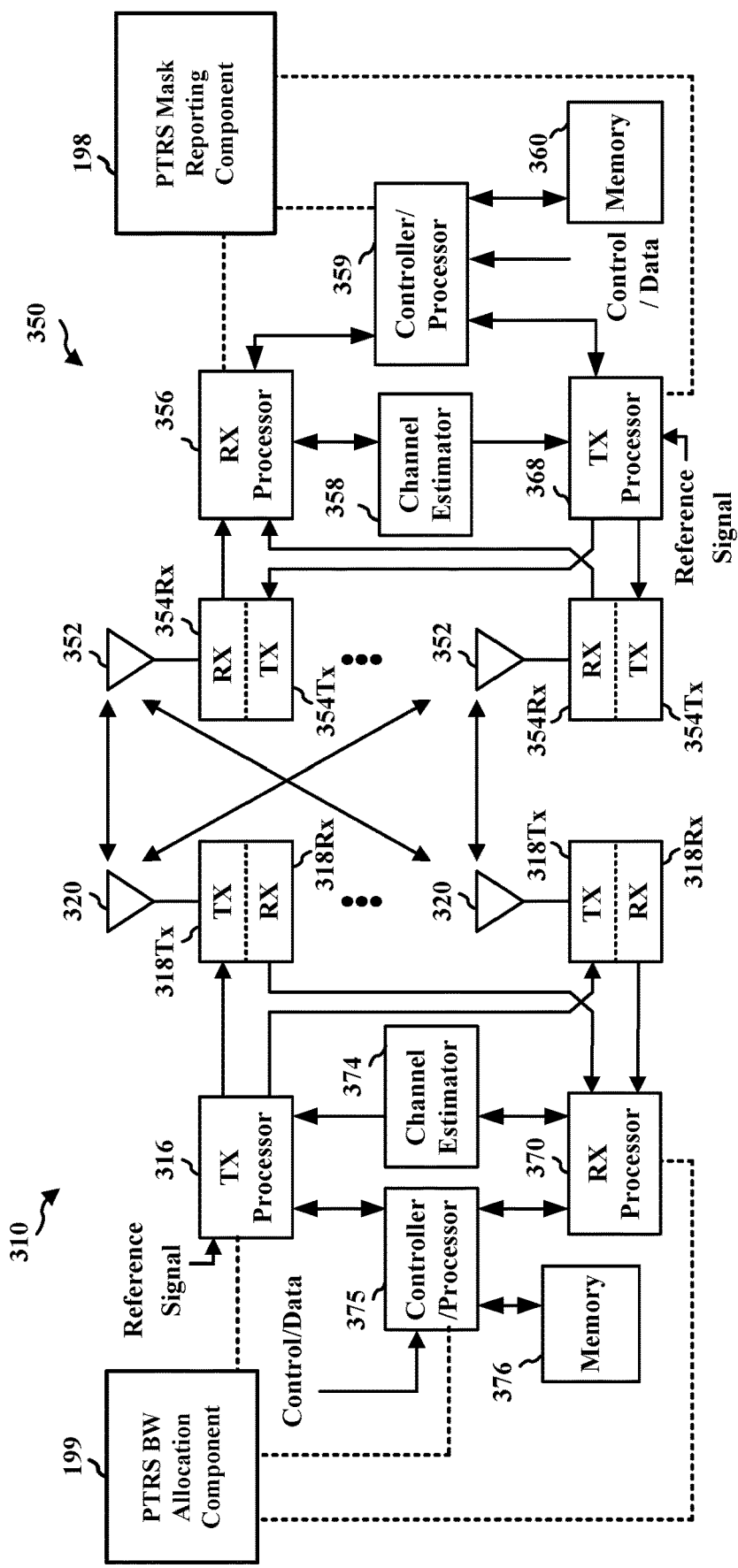
FIG. 3 is a diagram illustrating an example of a base station and user equipment (UE) in an access network.

FIG. 3 is a block diagram of a base station 310 in communication with a UE 350 in an access network. In the DL, Internet protocol (IP) packets may be provided to a controller/processor 375. The controller/processor 375 implements layer 3 and layer 2 functionality. Layer 3 includes a radio resource control (RRC) layer, and layer 2 includes a service data adaptation protocol (SDAP) layer, a packet data convergence protocol (PDCP) layer, a radio link control (RLC) layer, and a medium access control (MAC) layer. The controller/processor 375 provides RRC layer functionality associated with broadcasting of system information (e.g., MIB, SIBs), RRC connection control (e.g., RRC connection paging, RRC connection establishment, RRC connection modification, and RRC connection release), inter radio access technology (RAT) mobility, and measurement configuration for UE measurement reporting; PDCP layer functionality associated with header compression/decompression, security (ciphering, deciphering, integrity protection, integrity verification), and handover support functions; RLC layer functionality associated with the transfer of upper layer packet data units (PDUs), error correction through ARQ, concatenation, segmentation, and reassembly of RLC service data units (SDUs), re-segmentation of RLC data PDUs, and reordering of RLC data PDUs; and MAC layer functionality associated with mapping between logical channels and transport channels, multiplexing of MAC SDUs onto transport blocks (TBs), demultiplexing of MAC SDUs from TBs, scheduling information reporting, error correction through HARQ, priority handling, and logical channel prioritization.

The transmit (TX) processor 316 and the receive (RX) processor 370 implement layer 1 functionality associated with various signal processing functions. Layer 1, which includes a physical (PHY) layer, may include error detection on the transport channels, forward error correction (FEC) coding/decoding of the transport channels, interleaving, rate matching, mapping onto physical channels, modulation/demodulation of physical channels, and MIMO antenna processing. The TX processor 316 handles mapping to signal constellations based on various modulation schemes (e.g., binary phase-shift keying (BPSK), quadrature phase-shift keying (QPSK), M-phase-shift keying (M-PSK), M-quadrature amplitude modulation (M-QAM)). The coded and modulated symbols may then be split into parallel streams. Each stream may then be mapped to an OFDM subcarrier, multiplexed with a reference signal (e.g., pilot) in the time and/or frequency domain, and then combined together using an Inverse Fast Fourier Transform (IFFT) to produce a physical channel carrying a time domain OFDM symbol stream. The OFDM stream is spatially precoded to produce multiple spatial streams. Channel estimates from a channel estimator 374 may be used to determine the coding and modulation scheme, as well as for spatial processing. The channel estimate may be derived from a reference signal and/or channel condition feedback transmitted by the UE 350. Each spatial stream may then be provided to a different antenna 320 via a separate transmitter 318Tx. Each transmitter 318Tx may modulate a radio frequency (RF) carrier with a respective spatial stream for transmission.

At the UE 350, each receiver 354Rx receives a signal through its respective antenna 352. Each receiver 354Rx recovers information modulated onto an RF carrier and provides the information to the receive (RX) processor 356. The TX processor 368 and the RX processor 356 implement layer 1 functionality associated with various signal processing functions. The RX processor 356 may perform spatial processing on the information to recover any spatial streams destined for the UE 350. If multiple spatial streams are destined for the UE 350, they may be combined by the RX processor 356 into a single OFDM symbol stream. The RX processor 356 then converts the OFDM symbol stream from the time-domain to the frequency domain using a Fast Fourier Transform (FFT). The frequency domain signal includes a separate OFDM symbol stream for each subcarrier of the OFDM signal. The symbols on each subcarrier, and the reference signal, are recovered and demodulated by determining the most likely signal constellation points transmitted by the base station 310. These soft decisions may be based on channel estimates computed by the channel estimator 358. The soft decisions are then decoded and deinterleaved to recover the data and control signals that were originally transmitted by the base station 310 on the physical channel. The data and control signals are then provided to the controller/processor 359, which implements layer 3 and layer 2 functionality.

The controller/processor 359 can be associated with at least one memory 360 that stores program codes and data. The at least one memory 360 may be referred to as a computer-readable medium. In the UL, the controller/processor 359 provides demultiplexing between transport and logical channels, packet reassembly, deciphering, header decompression, and control signal processing to recover IP packets. The controller/processor 359 is also responsible for error detection using an ACK and/or NACK protocol to support HARQ operations.

Similar to the functionality described in connection with the DL transmission by the base station 310, the controller/processor 359 provides RRC layer functionality associated with system information (e.g., MIB, SIBs) acquisition, RRC connections, and measurement reporting; PDCP layer functionality associated with header compression/decompression, and security (ciphering, deciphering, integrity protection, integrity verification); RLC layer functionality associated with the transfer of upper layer PDUs, error correction through ARQ, concatenation, segmentation, and reassembly of RLC SDUs, re-segmentation of RLC data PDUs, and reordering of RLC data PDUs; and MAC layer functionality associated with mapping between logical channels and transport channels, multiplexing of MAC SDUs onto TBs, demultiplexing of MAC SDUs from TBs, scheduling information reporting, error correction through HARQ, priority handling, and logical channel prioritization.

Channel estimates derived by a channel estimator 358 from a reference signal or feedback transmitted by the base station 310 may be used by the TX processor 368 to select the appropriate coding and modulation schemes, and to facilitate spatial processing. The spatial streams generated by the TX processor 368 may be provided to different antennas 352 via separate transmitters 354Tx. Each transmitter 354Tx may modulate an RF carrier with a respective spatial stream for transmission.

The UL transmission is processed at the base station 310 in a manner similar to that described in connection with the receiver function at the UE 350. Each receiver 318Rx receives a signal through its respective antenna 320. Each receiver 318Rx recovers information modulated onto an RF carrier and provides the information to a RX processor 370.

The controller/processor 375 can be associated with at least one memory 376 that stores program codes and data. The at least one memory 376 may be referred to as a computer-readable medium. In the UL, the controller/processor 375 provides demultiplexing between transport and logical channels, packet reassembly, deciphering, header decompression, control signal processing to recover IP packets. The controller/processor 375 is also responsible for error detection using an ACK and/or NACK protocol to support HARQ operations.

At least one of the TX processor 368, the RX processor 356, and the controller/processor 359 may be configured to perform aspects in connection with the PTRS mask reporting component 198 of FIG. 1.

At least one of the TX processor 316, the RX processor 370, and the controller/processor 375 may be configured to perform aspects in connection with the PTRS BW allocation component 199 of FIG. 1.

As discussed above, for higher order modulation schemes, phase noise may represent a significant component of the overall noise for a DL signal received at a wireless device and a continuous PTRS (in the frequency domain) may be used (e.g., transmitted along with data) to estimate the phase noise across the range of frequencies for phase noise mitigation. The phase noise mitigation, in some aspects, may include a phase noise estimation operation and a phase noise correction operation. For example, the continuous PTRS may enable the estimation of a phase noise power relative to a power of an associated carrier frequency as a function of a frequency offset from the carrier frequency (e.g., a phase noise mask) for a range of frequencies based on the extent, in the frequency domain, of the continuous PTRS. Based on the estimated phase noise mask, the wireless device may be able to deconvolve a received signal (as part of a phase noise correction operation) to recover a transmitted signal.

FIG. 4 includes a first chart 400 illustrating a phase noise power relative to a power of an associated carrier frequency (e.g., a relative phase noise power) as a function of a frequency offset from the carrier frequency (e.g., a phase noise mask), a second chart 450 illustrating a relative phase noise power as a function of subcarriers used to carry PTRS for a particular SCS, and a set of illustrations of a PTRS configuration associated with different RIPNPs. While the second chart 450 illustrates the relative phase noise power as a function of subcarriers, in some aspects, it may represent an estimation of a chart of the relative phase noise power as a function of frequency offset. For example, the second chart 450 may represent a quantization based on the particular SCS (e.g., the frequency range may be divided into units corresponding to the frequency of a single subcarrier based on the SCS) and an assumption of a constant phase noise over the bandwidth associated with a single carrier. In some aspects, the first chart 400 and the second chart 450 may be specific to a particular wireless device (e.g., may be UE-specific). The first chart 400 for a particular wireless device, in some aspects, may be identified based on one or more of a manufacturer, a model, or a particular component of the wireless device and may be known in advance based on prior testing of an equivalent wireless device. The function (or curve 455) illustrated in the second chart 450, in some aspects, may be used to determine or calculate a residual integrated phase noise (relative) power (e.g., the RIPNP) as a function of a number of subcarriers (taps) used to carry PTRS (e.g., for the particular SCS). In some aspects, the determination and/or calculation of the RIPNP may be performed based on the first chart 400 known in advance such that a wireless device may be configured (e.g., by a manufacturer) with the RIPNP function and/or information relating to the RIPNP (e.g., data indicating a number of taps and/or subcarriers associated with different amounts of RIPNP).

The second chart 450 illustrates the curve 455 representing a power associated with each subcarrier and/or tap carrying PTRS as measured from a starting frequency (e.g., a frequency selected as a reference frequency). In some aspects, the starting frequency may be one of a starting (e.g., a lowest) frequency of the continuous block of subcarriers including the PTRS, an ending (e.g., a highest) frequency of the continuous block of subcarriers including the PTRS, or a centrally located frequency within the continuous block of subcarriers including the PTRS. The second chart 450 further illustrates that for a selected number ($N_4$) of taps and/or subcarriers carrying PTRS, the phase noise that may be corrected is the area 460 under the curve 455 from 0 taps and/or subcarriers to the selected number ($N_4$) of taps and/or subcarriers. The second chart 450 further illustrates that for the selected number ($N_4$) of taps and/or subcarriers carrying PTRS, the residual phase noise power (e.g., the RIPNP) associated with omitting the PTRS from the remaining taps and/or subcarriers is the area 470 under the curve 455 from the selected number ($N_4$) of taps and/or subcarriers to an upper bound.

As illustrated in the first chart 400 and the second chart 450, while the ability to estimate and/or correct (or mitigate) phase noise increases with each additional tap and/or subcarrier carrying or including the PTRS, the amount of additional phase noise correction per tap and/or subcarrier decreases with each subcarrier. For example, the function (or curve 405) illustrated in the first chart 400 (and the associated function (or curve 455) illustrated in the second chart 450) indicates that a wide range of frequencies may contribute to the phase noise, but that the contributions tend to decrease at larger frequency offsets. In some aspects, each additional bit encoded in a symbol lowers a threshold SNR for accurate demodulation (e.g., demodulation with an error rate such as a bit error rate (BER), symbol error rate (SER), or block error rate (BLER) that is below a threshold value) by approximately 3 dB (e.g., approximately halving the SNR). For example, a threshold SNR associated with 256-QAM (e.g., encoding 8 bits per symbol) may be ~−35 dB while the threshold SNR associated with 512-QAM (e.g., encoding 9 bits per symbol) may be ~−38 dB.

Diagram 480 illustrates a first configuration of PTRS over a non-contiguous set of subcarriers that may be used to estimate and/or correct for constant phase noise. The first configuration of PTRS, in some aspects, may include PTRS in a non-contiguous subset of subcarriers of one or more resource blocks. Diagram 491, diagram 493, diagram 495, diagram 497, and diagram 499 illustrate contiguous PTRS for the estimation and/or correction of non-constant phase noise in accordance with some aspects of the disclosure. For example, diagrams 491 to 499 illustrate the use of different numbers of contiguous PTRS that may be associated with different RIPNPs as discussed in relation to at least FIG. 5.

Figure 5:
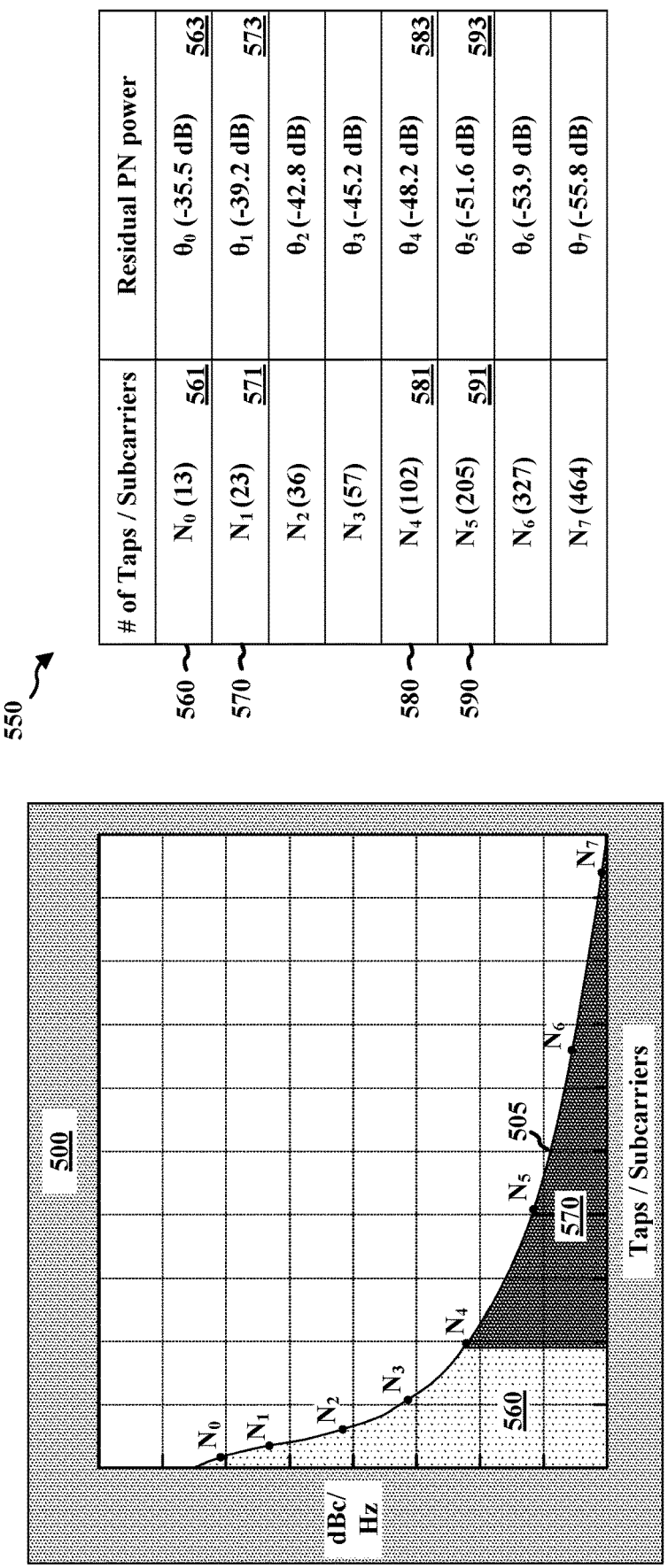
FIG. 5 includes a chart similar to chart and a table illustrating a number of taps and/or subcarriers corresponding to each of a plurality of threshold SNR values for a particular wireless device.

FIG. 5 includes a chart 500 (including a curve 505) similar to the first chart 450 and a table 550 illustrating a number of taps and/or subcarriers corresponding to each of a plurality of threshold SNR values for a particular wireless device. The table 550, or the data represented by the table 550 may be stored in the particular wireless device to be shared as described below in relation to FIG. 6. While shown as table 550, the information may be in any data format storing a mapping between one or more (e.g., a plurality of) RIPNPs and corresponding numbers of taps and/or subcarriers. Table 550 includes a set of entries (e.g., including entry 560, entry 570, entry 580, and entry 590) identifying a number of taps and/or subcarriers ($N_1$) corresponding to different thresholds ($\theta_1$) for residual integrated phase noise power associated with a maximal phase noise power that may allow for demodulation of a corresponding modulation order. For example, a first threshold 563 (e.g., $\theta_0$) that may be associated with a first modulation (e.g., 256-QAM) (or modulation and coding scheme (MCS)) is identified as corresponding to a first number 561 (No) of taps and/or subcarriers (e.g., 13 taps and/or subcarriers being associated with a RIPNP of ~−35.5 dB). Similarly, a second threshold 573 (e.g., $\theta_1$), a fifth threshold 583 (e.g., $\theta_4$), and a sixth threshold 593 (e.g., $\theta_5$) may be identified as corresponding to a second number 571 ($N_1$) of taps and/or subcarriers, a fifth number 581 ($N_4$) of taps and/or subcarriers, and a sixth number 591 ($N_5$) of taps and/or subcarriers, respectively. For example, the table 550 may identify that 23, 36, 57, 102, 205, 327, 464 taps and/or subcarriers may be associated with a RIPNP of ~−39.2 dB, ~−42.8 dB, ~−45.2 dB, ~−48.2 dB, ~−51.6 dB, ~−53.9 dB, ~−55.8 dB, respectively. As described above, the indicated thresholds are separated from adjacent thresholds by approximately 3 dB (e.g., the difference between the first threshold 563 and the second threshold 573 or the fifth threshold 583 and the sixth threshold 593), but the difference in the number of taps and/or subcarriers between adjacent entries grows as the threshold RIPNP is reduced (e.g., difference between No and $N_1$ is 10, while the difference between $N_4$ and $N_5$ is 103 for a similar ~3 dB difference). While the specific numbers of taps and/or subcarriers and the threshold values may be different for different wireless devices (e.g., associated with different phase noise masks), the general trends illustrated by chart 500 and table 550 (e.g., the number of additional subcarriers used to achieve a similar gain in phase noise mitigation increasing for adjacent threshold values) may be representative of the relationship between the number of taps and/or subcarriers used to transmit the PTRS and the corresponding RIPNP for other devices.

As described above, some PTRS configurations may use a fixed number of continuous taps and/or subcarriers carrying the PTRS based on an expected phase noise mask and, in some aspects, an expected modulation order modulation for all communications (e.g., independent of UE-specific phase noise mask information and, in some aspects, a modulation order associated with a particular communication or transmission). The expected phase noise mask and/or the fixed number of continuous taps and/or subcarriers carrying the PTRS, in some aspects, may be configured to achieve a particular error rate (e.g., a SER of $10^{-5}$) for a particular percent (e.g., 90%-99%) of wireless devices. The fixed number of continuous taps and/or subcarriers carrying the PTRS, in some aspects, may further be determined based on a highest-order modulation expected or may be determined based on a modulation order selected, or known, by the transmitting device. As the number of taps and/or subcarriers carrying the PTRS to enable phase noise estimation and correction may vary significantly between devices and for different modulation orders (or MCS), using a number of taps and/or subcarriers corresponding to (1) a phase noise mask with a higher RIPNP for a same number of taps and/or subcarriers or (2) a modulation order that is higher than the modulation order used for a particular communication may waste resources (e.g., may increase overhead, power consumption, complexity, and/or latency).

For example, using the example of table 550, if the wrong MCS or threshold RIPNP value is identified for a communication such that the sixth number 591 ($N_5$) of taps and/or subcarriers (e.g., 205 taps and/or subcarriers) is used based on applying the sixth threshold 593 (e.g., $\theta_5$) instead of using the fifth number 581 ($N_4$) of taps and/or subcarriers (e.g., 102 taps and/or subcarriers) based on applying the fifth threshold 583 (e.g., $\theta_4$) it would result in using approximately 100 additional taps and/or subcarriers beyond the number of taps and/or subcarriers sufficient to estimate and correct the phase noise. The approximately 100 additional taps and/or subcarriers in such a case would represent an increase of approximately 100% in the overhead. Similarly, if a generic table is used with RIPNP thresholds mapped based on a phase noise mask that is expected to be as bad, or worse, than the phase noise mask associated with most devices (e.g., one of 50%, 85%, 90%, or 95% of devices), a selected RIPNP threshold may be associated with a larger number of taps and/or carriers than would be sufficient for phase noise estimation and correction at the particular device associated with the table 550.

Figure 6:
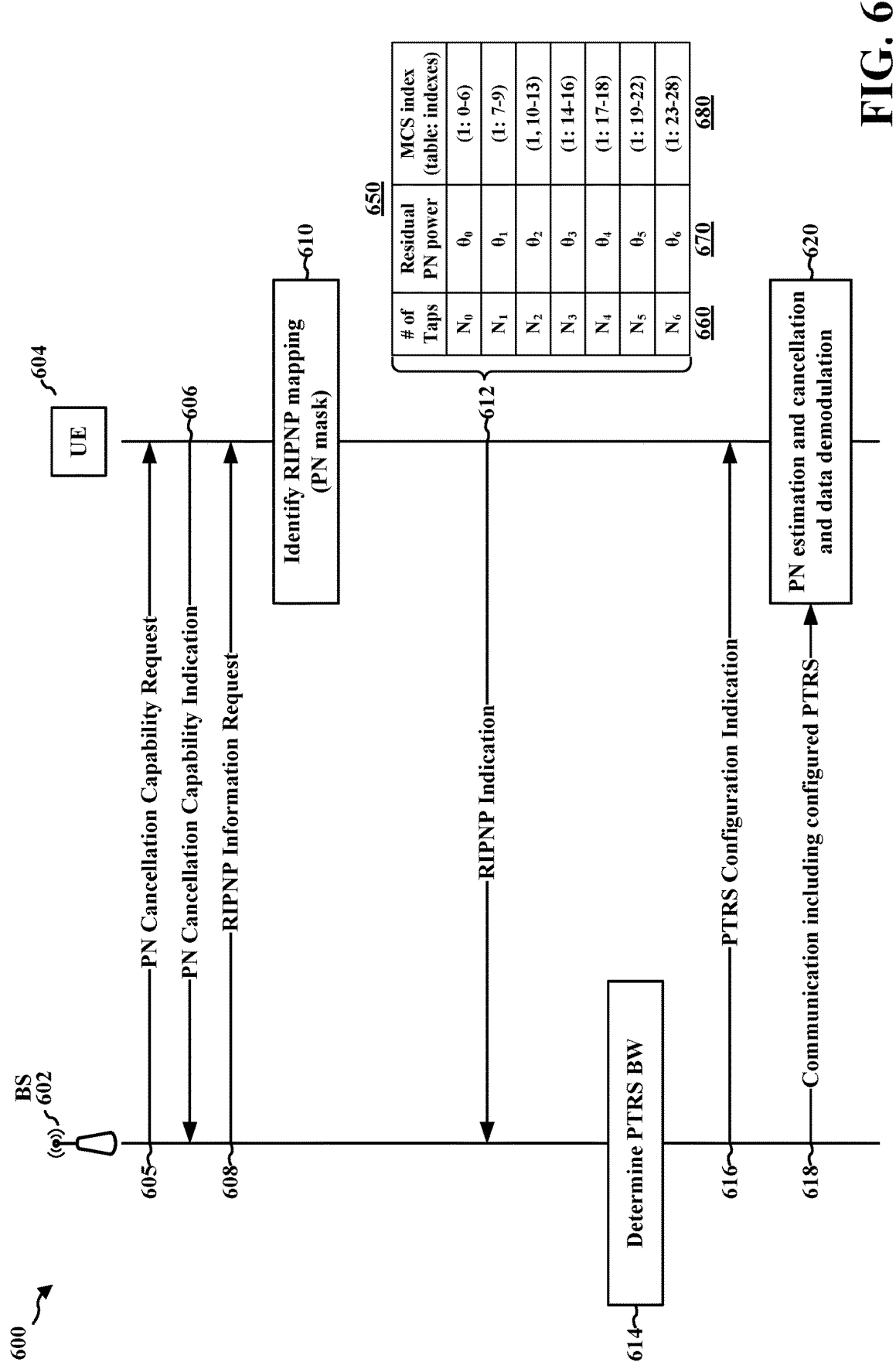
FIG. 6 is a call flow diagram illustrating a method of PTRS resource allocation for wireless communication.

FIG. 6 is a call flow diagram 600 illustrating a method of PTRS resource allocation for wireless communication. Call flow diagram 600 includes a base station 602 (e.g., as an example of a network device or network node that may include one or more components of a disaggregated base station) that may be involved in communication with a UE 604 (e.g., as an example of a wireless device). The functions ascribed to the base station 602, in some aspects, may be performed by one or more components of a network entity, a network node, or a network device (a single network entity/node/device or a disaggregated network entity/node/device as described above in relation to FIG. 1). Similarly, the functions ascribed to the UE 604, in some aspects, may be performed by one or more components of a wireless device supporting communication with a network entity/node/device. Accordingly, references to "transmitting" in the description below may be understood to refer to a first component of the base station 602 (or the UE 604) outputting (or providing) an indication of the content of the transmission to be transmitted by a different component of the base station 602 (or the UE 604). Similarly, references to "receiving" in the description below may be understood to refer to a first component of the base station 602 (or the UE 604) receiving a transmitted signal and outputting (or providing) the received signal (or information based on the received signal) to a different component of the base station 602 (or the UE 604).

In some aspects, the base station 602 may transmit, and the UE 604 may receive, a phase noise cancellation capability request 605 included a request for an indication of whether the UE 604 is capable of performing a phase noise estimation and cancellation using a contiguous PTRS and reporting RIPNP mapping associated with the use of the contiguous PTRS to perform the phase noise estimation and cancellation. The UE 604 may transmit, and the base station 602 may receive, a phase noise cancellation capability indication 606. In some aspects, the phase noise cancellation capability indication 606 may be transmitted in response to the phase noise cancellation capability request 605. In some aspects, the phase noise cancellation capability request 605 may be omitted and the phase noise cancellation capability indication 606 may be transmitted in association with an attachment to the base station 602 (e.g., acting as a serving cell). For example, the phase noise cancellation capability indication 606 may be transmitted via RRC and/or MAC-layer signaling in association with the attachment process. The phase noise cancellation capability indication 606, in some aspects, may include an indication (e.g., a single-bit or multi-bit indication) that the UE 604 is capable of reporting information regarding a mapping of RIPNP to a number of taps and/or subcarriers.

The base station 602, in some aspects, may transmit, and the UE 604 may receive, a RIPNP indication request 608. The RIPNP indication request 608, in some aspects, may be transmitted based on the phase noise cancellation capability indication 606. In some aspects, the phase noise cancellation capability indication 606 may be omitted and the base station may transmit the RIPNP indication request 608 as part of, or following, an attachment procedure. The RIPNP indication request 608, in some aspects, may indicate for the UE 604 to report (or indicate) at least one of (1) a capability to report the RIPNP information (e.g., where the phase noise cancellation capability indication 606 may be transmitted in response to the RIPNP indication request 608) and/or (2) the RIPNP information. The RIPNP indication request 608, in some aspects, may indicate a set of parameters for generating the RIPNP information such as an MCS index table used for the associated communication (e.g., an associated data signal) or a set of threshold RIPNP values associated with the communication (e.g., a list of RIPNPs for which to provide a corresponding number of taps and/or subcarriers).

The UE 604 may, at 610, identify a mapping of RIPNP to numbers of taps and/or subcarriers (e.g., a RIPNP associated with a phase noise mask) associated with a receiver of the UE 604. The mapping may indicate mappings associated with a configured set of RIPNP thresholds for a known set of RIPNP thresholds associated with different modulation orders and/or MCS indexes. In some aspects, the UE 604 may be configured with a mapping of a plurality of RIPNPs to a corresponding plurality of numbers of taps and/or subcarriers for carrying PTRS. For example, the plurality of RIPNPs may include a set of RIPNP thresholds associated with different QAM orders (e.g., 256-QAM, 512-QAM, etc.) or may include a set of RIPNP values separated by a same scaling factor (e.g., a set of RIPNP values in 1 dB steps) that may then be selected from based on the MCS index table configured during the attachment process. The plurality of RIPNPs, in some aspects, may include RIPNPs allowing for different possible MCSs or MCS indexes (e.g., for each of a plurality of MCS tables). The mapping information (e.g., table 650), in some aspects, may further identify an MCS index table and an MCS index associated with each mapping (e.g., MCS index 680) to identify a relevant set of mappings for a particular communication session using a particular MCS index table.

Additionally, the mapping of RIPNP may be identified at 610 based on additional considerations or characteristics of the communication with the base station 602. For example, the type of communication (eMBB, mMTC, or URLLC) may be indicated or known to the UE 604 and may be used to determine an acceptable BER, BLER, or SER that may be associated with a particular set of RIPNP values for different MCS indexes or modulation orders. Additionally, or alternatively, the type of application may similarly effect the particular set of RIPNP values for different MCS indexes or modulation orders. In some aspects, a numerology or SCS may be used to determine a number of subcarriers corresponding to a frequency range or bandwidth associated with a selected and/or identified RIPNP. Accordingly, the mapping of the RIPNP to the numbers of taps and/or subcarriers identified may be based on multiple factors.

Based on the mapping identified at 610 and, in some aspects, the RIPNP indication request 608, the UE 604 may transmit, and the base station 602 may receive, RIPNP indication 612. The RIPNP indication 612, in some aspects, may include (1) information (e.g., table 650) mapping each of a plurality of RIPNPs (e.g., RIPNPs 670) to the corresponding number of subcarriers (e.g., # of taps 660) or (2) an index identifying one of a plurality of mappings of each of a plurality of RIPNPs to the corresponding number of subcarriers, where the index is into a set of mappings maintained at the network. In some aspects using the index identifying one of a plurality of mappings, the base station 602 may indicate the plurality of mappings in the RIPNP indication request 608 (or other related transmission as part of the attachment or RRC configuration) or the plurality of mappings may be a known (e.g., a configured) plurality of mappings. As discussed in relation to identifying the RIPNP mapping at 610, the RIPNP indication 612 may be specific to the communication.

Based on the RIPNP indication 612, the base station 602 may, at 614, determine a PTRS allocation (e.g., a PTRS BW)

within a set of frequencies (e.g., a BW or BWP) associated with the communication. The PTRS allocation determined at 614, in some aspects, may further be based on an MCS index associated with the communication, an application type associated with the communication, or other relevant characteristics of the communication.

The base station 602 may transmit, and the UE 604 may receive, a PTRS configuration indication 616 based on the PTRS allocation determined at 614. The PTRS configuration indication 616, in some aspects, may be transmitted via a PDCCH (e.g., via DCI) associated with a particular communication (e.g., including a data signal and the indicated PTRS). In some aspects, the PTRS configuration indication 616 may include an indication of the number of subcarriers carrying, or associated with, the PTRS and a location of the contiguous PTRS. The indication of the location of the PTRS, in some aspects, may include a starting position (e.g., indicating a particular RE in the frequency domain using absolute or relative indications) and length (e.g., in terms of a number of subcarriers or resource elements in the frequency domain).

The base station 602 may subsequently transmit, and the UE 604 may receive, a communication 618 including the configured PTRS along with an associated data signal. In some aspects, the configured PTRS may be included in at least each symbol associated with a data signal to be demodulated. The UE 604 may, at 620, perform, based on the configured PTRS, a phase noise estimation and correction operation for the data signal included in the communication 618. In some aspects, the phase noise estimation may be a dynamic phase noise estimation (e.g., per OFDM symbol). Based on the phase noise estimation and correction operation, the UE 604 may, at 620, demodulate the data signal included in the communication 618 and associated with the configured PTRS. For example, the phase noise estimation and correction may include an adjustment of a phase and/or amplitude identified for one or more symbols of the data signal based on the phase noise estimation.

In some aspects, the phase noise estimation may be based on a set of equations presented below (or a set of similar equations). For example, a received signal may be represented as y(f)=H(f)s(f)*I(f)+w(f), where H(f) represents the effects of the channel, s(f) is the transmitted signal, I(f) is the phase noise in the frequency domain, w(f) is an additive white Gaussian noise (AWGN), and "*" is a cyclic convolution operator. In some aspects, a channel estimation (e.g., where the estimated channel is $\hat{H}$) may be performed as part of estimating the phase noise. Additionally, a vector (U) representing the assumed phase noise BW in terms of subcarriers at the transmitter phase noise may be used. To calculate a signal $$\begin{pmatrix} y(m_{start}) \\ \vdots \\ \vdots \\ y(m_{end}) \end{pmatrix}$$

the following equations may be used.

$$\underbrace{\begin{pmatrix} \hat{H}s(m_{start}+u+1) & \cdots & \hat{H}s(m_{start}) & 0 & \cdots & 0 \\ \vdots & & & & & \vdots \\ \hat{H}s(m_{end}) & & \ddots & & & 0 \\ 0 & & & & & \hat{H}s(m_{start}) \\ \vdots & & & & & \vdots \\ 0 & \cdots & 0\,\hat{H}s(m_{end}) & \cdots & \hat{H}s(m_{end}-2u) \end{pmatrix}}_{M} \begin{pmatrix} I(-u) \\ \vdots \\ I(u) \end{pmatrix} +$$

$$ICI + \begin{pmatrix} w(m_{start}) \\ \vdots \\ \vdots \\ w(m_{end}) \end{pmatrix},$$

where [$m_{start}$, $m_{end}$] represent the known symbols (PTRS) interval, such that the least squares estimator may be given by: $I(f)=(M^H M)^{-1} M^H y(f)$. Based on the calculated I(f), in some aspects, a deconvolution (e.g., correction) operation may be performed to recover the transmitted signal. In some aspects, the channel estimation may be slightly affected by the phase noise impairment, such that an iterative method may be used, e.g., performing successive iterations of a channel estimation followed by a phase noise estimation that may be ended based on a convergence or other criteria. While one method that is consistent with an OFDM configuration has been presented, other estimation methods may be used based on a relevant configuration and/or constraints.

Figure 7:
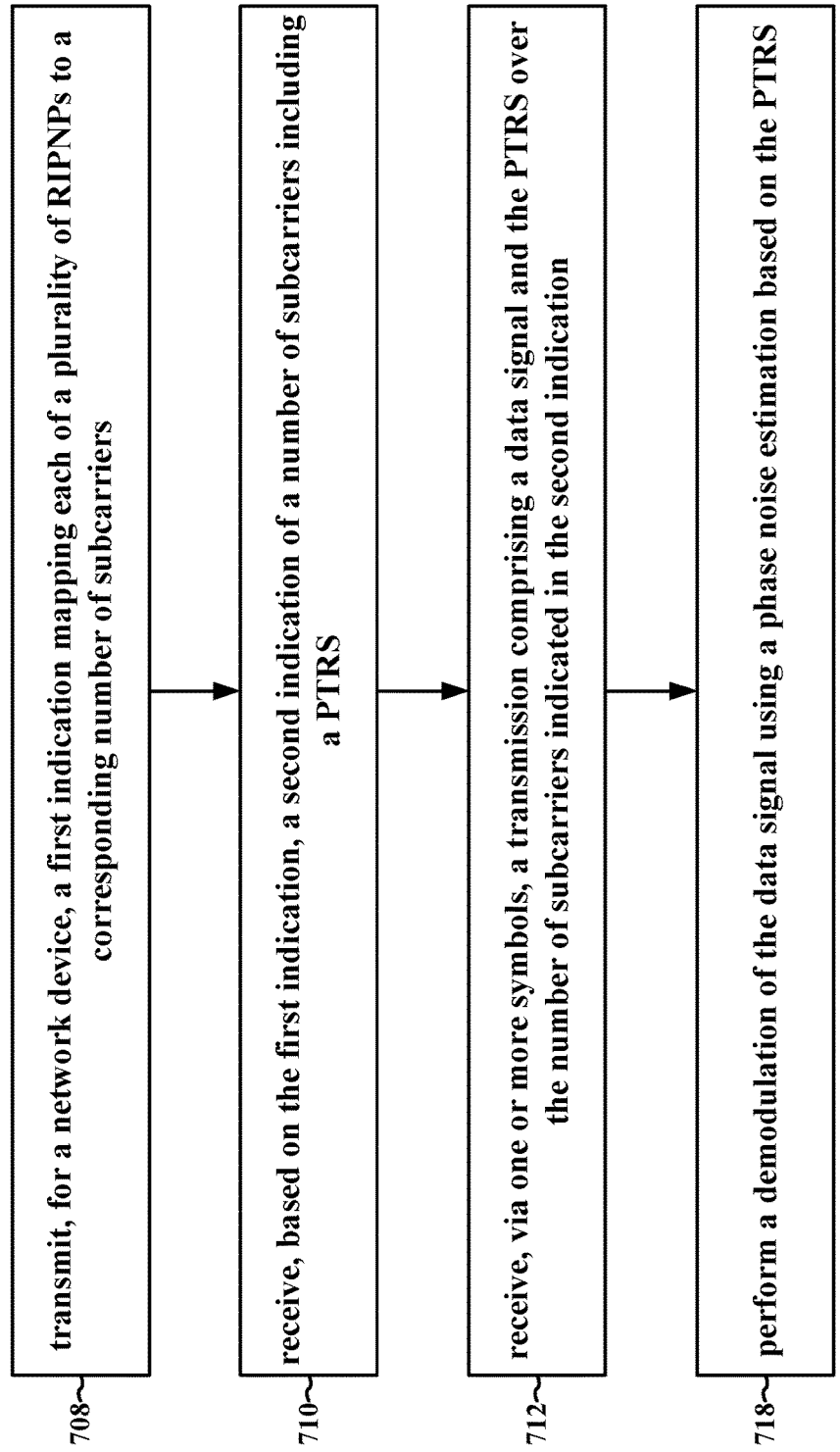
FIG. 7 is a flowchart of a method of wireless communication.

FIG. 7 is a flowchart 700 of a method of wireless communication. The method may be performed by a wireless device such as a UE (e.g., the UE 104, 604; the apparatus 1104). In some aspects, the UE may receive, from a network device, a request to provide an indication of the capability of the wireless device to use a PTRS over a number of contiguous subcarriers to perform a phase noise estimation and correction operation (e.g., a capability indication). In some aspects, the request to provide the capability indication may be omitted, for example, if the UE is configured to transmit the capability indication without a request. For example, referring to FIG. 6, the UE 604 may receive, from the base station 602, the phase noise cancellation capability request 605.

The UE, in some aspects, may transmit, for a network device, an indication of a capability to use a PTRS transmitted over a number of contiguous subcarriers to perform a phase noise estimation and correction operation. The capability indication, in some aspects, may be transmitted in response to the request to provide the capability indication or may be transmitted in the absence of the request as discussed above. Referring to FIG. 6, for example, the UE 604 may transmit, and the base station 602 may receive, phase noise cancellation capability indication 606 in response to phase noise cancellation capability request 605 or independently of the phase noise cancellation capability request 605.

In some aspects, the UE may receive, from a network device, a request to provide an indication of a mapping of RIPNPs to numbers of subcarriers (e.g., a RIPNP indication). In some aspects, the request may indicate an MCS index table for which to provide the indication of the mapping of RIPNPs to numbers of subcarriers. In some aspects, the request may also indicate a numerology (or SCS) associated with the communication that may be used to determine the mapping of RIPNPs to numbers of subcarriers. For example, referring to FIG. 6, the UE 604 may receive, from the base station 602, the RIPNP indication request 608.

At 708, the UE may transmit, for a network device, a first indication mapping each of a plurality of RIPNPs to a corresponding number of subcarriers. For example, 708 may be performed by application processor(s) 1106, cellular baseband processor(s) 1124, transceiver(s) 1122, antenna(s) 1180, and/or PTRS mask reporting component 198 of FIG. 11. The first indication, in some aspects, may be associated with MAC layer signaling. The MAC layer signaling, in some aspects, may be associated with attachment to a serving cell or base station. In some aspects, the first indication may include one of information mapping each of the plurality of RIPNPs to the corresponding number of subcarriers or an index identifying one of a plurality of mappings of each of the plurality of RIPNPs to the corresponding number of subcarriers maintained at the network device. The first indication may include the information mapping each of the plurality of RIPNPs to the corresponding number of subcarriers and each mapping may be associated with at least one modulation and coding scheme (MCS) index. For example, referring to FIG. 6, the UE 604 may transmit, and the base station 602 may receive, the RIPNP indication 612 (e.g., an indication that may include a table such as table 650 or other indication of mapping as described above).

At 710, the UE may receive, based on the first indication, a second indication of a number of subcarriers including a PTRS. For example, 710 may be performed by application processor(s) 1106, cellular baseband processor(s) 1124, transceiver(s) 1122, antenna(s) 1180, and/or PTRS mask reporting component 198 of FIG. 11. The second indication, in some aspects, may be associated with a PDCCH communication related to a data signal to be transmitted. In some aspects, the number of subcarriers may be indicated based on a number or RBs or REGs (e.g., sets of 12 subcarriers) or other unit (e.g., CCE) associated with resources in the frequency domain. The second indication, in some aspects, may further indicate a frequency (or set of frequency domain resources) associated with the number of contiguous subcarriers, e.g., one of a central frequency, a starting frequency, or an ending frequency. For example, referring to FIG. 6, the UE 604 may receive, from the base station 602, the PTRS configuration indication 616.

At 712, the UE may receive, via one or more symbols, a transmission including a data signal and the PTRS over the number of subcarriers indicated in the second indication. For example, 712 may be performed by application processor(s) 1106, cellular baseband processor(s) 1124, transceiver(s) 1122, antenna(s) 1180, and/or PTRS mask reporting component 198 of FIG. 11. In some aspects, the PTRS includes a continuous signal over a set of contiguous symbols (e.g., in a time domain) associated with the data signal. The set of contiguous symbols, in some aspects, may include each symbol also including the data signal. In some aspects, the number of subcarriers is a number of contiguous subcarriers in a frequency domain. For example, referring to FIG. 6, the UE 604 may receive, from the base station 602, the communication 618 including the PTRS over the indicated number of subcarriers and the data signal.

In some aspects, the UE may, based on the PTRS received over the number of subcarriers, estimate a phase noise associated with the data signal. In some aspects, the estimation may be performed per OFDM symbol or per symbol (e.g., signal associated with a particular quadrature, or phase, and amplitude representing multiple bits) of the modulated data signal. For example, referring to FIG. 6, the UE 604 may, at 620, perform a phase noise estimation operation on the communication 618.

The UE, in some aspects, may, based on the estimated phase noise, perform an adjustment of the received data signal. In some aspects, the adjustment may be performed per OFDM symbol or per symbol (e.g., signal associated with a particular quadrature, or phase, and amplitude representing multiple bits) of the modulated data signal. In some aspects, the adjustment may include one of removing the phase noise from the observed signal based on the estimated phase noise or canceling the phase noise effect of the observed signal based on the estimated phase noise. The adjustment in some aspects, may include a de-convolution function or operation (with the estimated phase noise mask) in the frequency domain. For example, referring to FIG. 6, the UE 604 may, at 620, perform a phase noise cancellation operation on the communication 618.

At 718, the UE may perform a demodulation of the data signal based on the PTRS (e.g., based on the phase noise estimation and cancellation). For example, 718 may be performed by application processor(s) 1106, cellular baseband processor(s) 1124, and/or PTRS mask reporting component 198 of FIG. 11. In some aspects, cancellation described above may be part of the demodulation or may be omitted if the estimated phase noise is used to determine a likelihood of a particular demodulation (e.g., an interpretation of a particular received signal representing a particular symbol). For example, referring to FIG. 6, the UE 604 may, at 620, perform a demodulation of the communication 618. After the demodulation, the UE may transmit, and the base station may receive, a feedback indicating whether the demodulation was successful.

Figure 8:
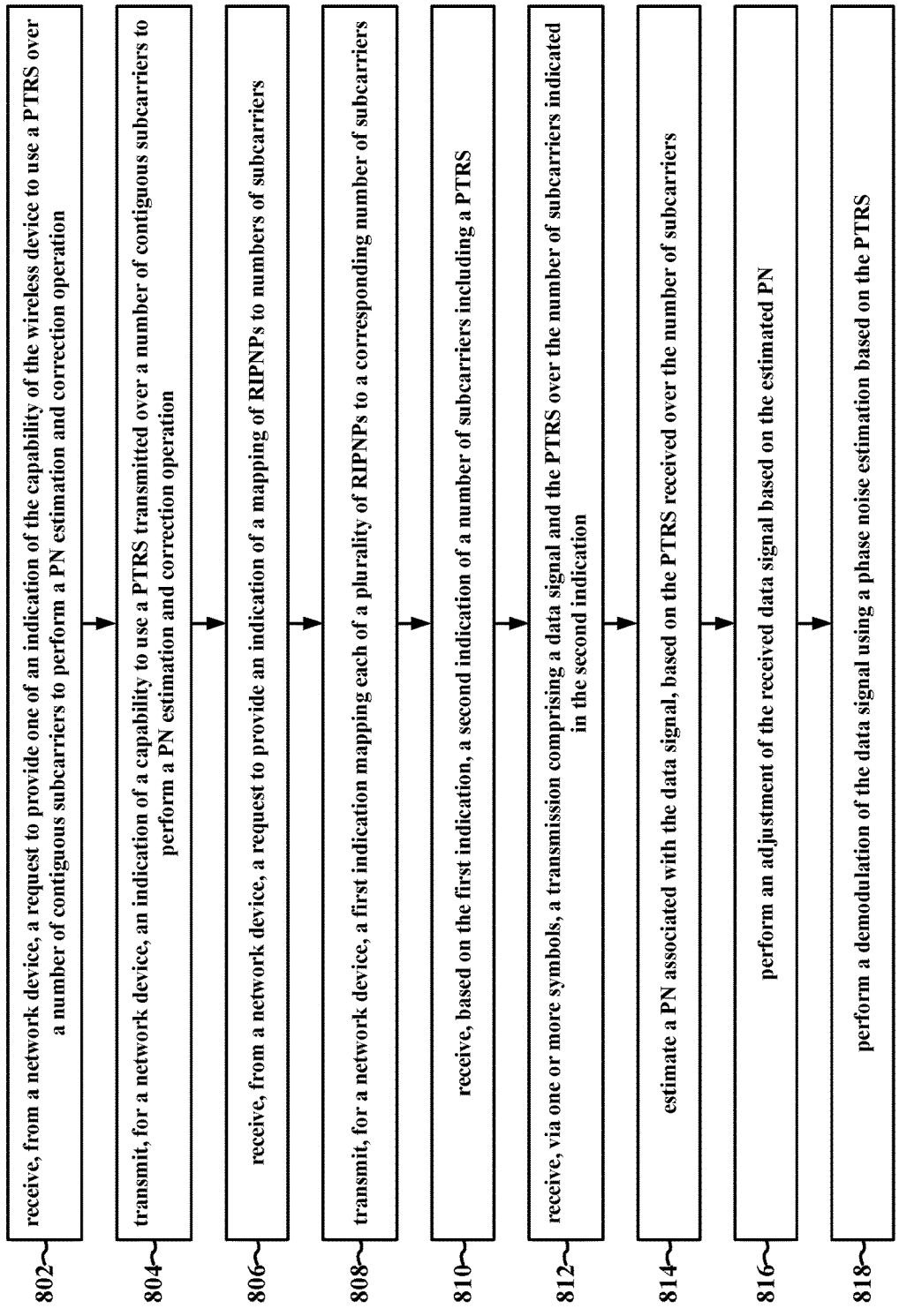
FIG. 8 is a flowchart of a method of wireless communication.

FIG. 8 is a flowchart 800 of a method of wireless communication. The method may be performed by a wireless device such as a UE (e.g., the UE 104, 604; the apparatus 1104). At 802, the UE may receive, from a network device, a request to provide an indication of the capability of the wireless device to use a PTRS over a number of contiguous subcarriers to perform a phase noise estimation and correction operation (e.g., a capability indication). For example, 802 may be performed by application processor(s) 1106, cellular baseband processor(s) 1124, transceiver(s) 1122, antenna(s) 1180, and/or PTRS mask reporting component 198 of FIG. 11. In some aspects, the request to provide the capability indication may be omitted, for example, if the UE is configured to transmit the capability indication without a request. For example, referring to FIG. 6, the UE 604 may receive, from the base station 602, the phase noise cancellation capability request 605.

At 804, the UE may transmit, for the network device, an indication of a capability to use a PTRS transmitted over a number of contiguous subcarriers to perform a phase noise estimation and correction operation. For example, 804 may be performed by application processor(s) 1106, cellular baseband processor(s) 1124, transceiver(s) 1122, antenna(s) 1180, and/or PTRS mask reporting component 198 of FIG. 11. The capability indication, in some aspects, may be transmitted in response to the request received at 802 or may be transmitted in the absence of the request as discussed above. Referring to FIG. 6, for example, the UE 604 may transmit, and the base station 602 may receive, phase noise cancellation capability indication 606 in response to phase noise cancellation capability request 605 or independently.

At 806, the UE may receive, from a network device, a request to provide an indication of a mapping of RIPNPs to numbers of subcarriers (e.g., a RIPNP indication). For example, 806 may be performed by application processor(s) 1106, cellular baseband processor(s) 1124, transceiver(s) 1122, antenna(s) 1180, and/or PTRS mask reporting component 198 of FIG. 11. In some aspects, the request may indicate an MCS index table for which to provide the indication of the mapping of RIPNPs to numbers of subcarriers. In some aspects, the request may also indicate a numerology (or SCS) associated with the communication that may be used to determine the mapping of RIPNPs to numbers of subcarriers. For example, referring to FIG. 6, the UE 604 may receive, from the base station 602, the RIPNP indication request 608.

At 808, the UE may transmit, for a network device, a first indication mapping each of a plurality of RIPNPs to a corresponding number of subcarriers. For example, 808 may be performed by application processor(s) 1106, cellular baseband processor(s) 1124, transceiver(s) 1122, antenna(s) 1180, and/or PTRS mask reporting component 198 of FIG. 11. The first indication, in some aspects, may be associated with MAC layer signaling. The MAC layer signaling, in some aspects, may be associated with attachment to a serving cell or base station. In some aspects, the first indication may include one of information mapping each of the plurality of RIPNPs to the corresponding number of subcarriers or an index identifying one of a plurality of mappings of each of the plurality of RIPNPs to the corresponding number of subcarriers maintained at the network device. The first indication may include the information mapping each of the plurality of RIPNPs to the corresponding number of subcarriers and each mapping may be associated with at least one modulation and coding scheme (MCS) index. For example, referring to FIG. 6, the UE 604 may transmit, and the base station 602 may receive, the RIPNP indication 612 (e.g., an indication that may include a table such as table 650 or other indication of mapping as described above).

At 810, the UE may receive, based on the first indication, a second indication of a number of subcarriers including a PTRS. For example, 810 may be performed by application processor(s) 1106, cellular baseband processor(s) 1124, transceiver(s) 1122, antenna(s) 1180, and/or PTRS mask reporting component 198 of FIG. 11. The second indication, in some aspects, may be associated with a PDCCH communication related to a data signal to be transmitted. In some aspects, the number of subcarriers may be indicated based on a number or RBs or REGs (e.g., sets of 12 subcarriers) or other unit (e.g., CCE) associated with resources in the frequency domain. The second indication, in some aspects, may further indicate a frequency (or set of frequency domain resources) associated with the number of contiguous subcarriers, e.g., one of a central frequency, a starting frequency, or an ending frequency. For example, referring to FIG. 6, the UE 604 may receive, from the base station 602, the PTRS configuration indication 616.

At 812, the UE may receive, via one or more symbols, a transmission including a data signal and the PTRS over the number of subcarriers indicated in the second indication. For example, 812 may be performed by application processor(s) 1106, cellular baseband processor(s) 1124, transceiver(s) 1122, antenna(s) 1180, and/or PTRS mask reporting component 198 of FIG. 11. In some aspects, the PTRS includes a continuous signal over a set of contiguous symbols (e.g., in a time domain) associated with the data signal. The set of contiguous symbols, in some aspects, may include each symbol also including the data signal. In some aspects, the number of subcarriers is a number of contiguous subcarriers in a frequency domain. For example, referring to FIG. 6, the UE 604 may receive, from the base station 602, the communication 618 including the PTRS over the indicated number of subcarriers and the data signal.

At 814, the UE may, based on the PTRS received over the number of subcarriers, estimate a phase noise associated with the data signal. For example, 814 may be performed by application processor(s) 1106, cellular baseband processor(s) 1124, and/or PTRS mask reporting component 198 of FIG. 11. In some aspects, the estimation may be performed per OFDM symbol or per symbol (e.g., signal associated with a particular quadrature, or phase, and amplitude representing multiple bits) of the modulated data signal. For example, referring to FIG. 6, the UE 604 may, at 620, perform a phase noise estimation operation on the communication 618.

At 816, the UE may, based on the estimated phase noise, perform an adjustment of the received data signal. For example, 816 may be performed by application processor(s) 1106, cellular baseband processor(s) 1124, and/or PTRS mask reporting component 198 of FIG. 11. In some aspects, the adjustment may be performed per OFDM symbol or per symbol (e.g., signal associated with a particular quadrature, or phase, and amplitude representing multiple bits) of the modulated data signal. In some aspects, the adjustment may include one of removing the phase noise from the observed signal based on the estimated phase noise or canceling the phase noise effect of the observed signal based on the estimated phase noise. The adjustment in some aspects, may include a de-convolution function or operation (with the estimated phase noise mask) in the frequency domain. For example, referring to FIG. 6, the UE 604 may, at 620, perform a phase noise cancellation operation on the communication 618.

At 818, the UE may perform a demodulation of the data signal based on the PTRS (e.g., based on the phase noise estimation and cancellation). For example, 818 may be performed by application processor(s) 1106, cellular baseband processor(s) 1124, and/or PTRS mask reporting component 198 of FIG. 11. In some aspects, cancellation described above may be part of the demodulation or may be omitted if the estimated phase noise is used to determine a likelihood of a particular demodulation (e.g., an interpretation of a particular received signal representing a particular symbol). For example, referring to FIG. 6, the UE 604 may, at 620, perform a demodulation of the communication 618. After the demodulation, the UE may transmit, and the base station may receive, a feedback indicating whether the demodulation was successful.

Figure 9:
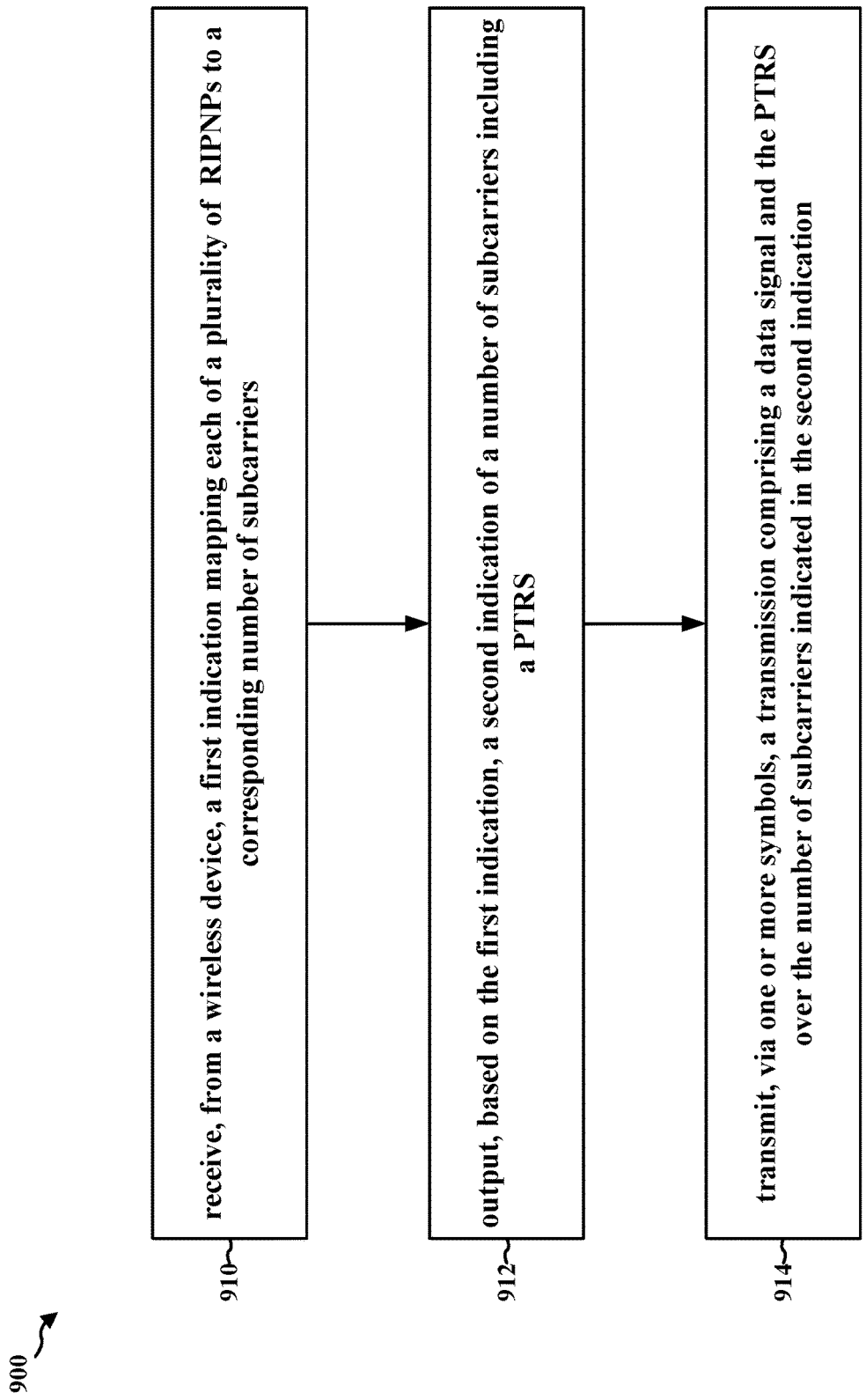
FIG. 9 is a flowchart of a method of wireless communication.

FIG. 9 is a flowchart 900 of a method of wireless communication. The method may be performed by a network device such as a base station (e.g., the base station 102, 602; the network entity 1102, 1202). In some aspects, the base station may output, for a wireless device (e.g., a UE), a request to provide an indication of the capability of the wireless device to use a PTRS over a number of contiguous subcarriers to perform a phase noise estimation and correction operation (e.g., a capability indication). In some aspects, the request to provide the capability indication may be omitted, for example, if the UE is configured to transmit the capability indication without a request. For example, referring to FIG. 6, the base station 602 may output, for the UE 604, the phase noise cancellation capability request 605.

The base station, in some aspects, may receive, from the wireless device, an indication of a capability to use a PTRS transmitted over a number of contiguous subcarriers to perform a phase noise estimation and correction operation. The capability indication, in some aspects, may be received in response to the request or may be received in the absence of the request as discussed above. Referring to FIG. 6, for example, the base station 602 may receive, and the UE 604 may output, phase noise cancellation capability indication 606 in response to phase noise cancellation capability request 605 or independent of the phase noise cancellation capability request 605.

In some aspects, the base station may output, for the wireless device, a request to provide an indication of a mapping of RIPNPs to numbers of subcarriers (e.g., a RIPNP indication). In some aspects, the request may indicate an MCS index table for which to provide the indication of the mapping of RIPNPs to numbers of subcarriers. In some aspects, the request may also indicate a numerology (or SCS) associated with the communication that may be used to determine the mapping of RIPNPs to numbers of subcarriers. For example, referring to FIG. 6, the base station 602 may output, for the UE 604, the RIPNP indication request 608.

At 910, the base station may receive, from the wireless device, a first indication mapping each of a plurality of RIPNPs to a corresponding number of subcarriers. For example, 910 may be performed by CU processor(s) 1212, DU processor(s) 1232, RU processor(s) 1242, transceiver(s) 1246, antenna(s) 1280, and/or PTRS BW allocation component 199 of FIG. 12. The first indication, in some aspects, may be associated with MAC layer signaling. The MAC layer signaling, in some aspects, may be associated with attachment to a serving cell or base station. In some aspects, the first indication may include one of information mapping each of the plurality of RIPNPs to the corresponding number of subcarriers or an index identifying one of a plurality of mappings of each of the plurality of RIPNPs to the corresponding number of subcarriers maintained at the network device. The first indication may include the information mapping each of the plurality of RIPNPs to the corresponding number of subcarriers and each mapping may be associated with at least one modulation and coding scheme (MCS) index. For example, referring to FIG. 6, the base station 602 may receive, and the UE 604 may transmit, the RIPNP indication 612 (e.g., an indication that may include a table such as table 650 or other indication of mapping as described above).

In some aspects, the base station may, based on the first indication and an MCS (or MCS index) associated with a data signal, determine the number of subcarriers indicated in the second indication. In some aspects, the base station may determine a PTRS allocation (e.g., a PTRS BW) within a set of frequencies (e.g., a BW or BWP) associated with the communication. The determined PTRS allocation, in some aspects, may further be based on an application type associated with the communication or other relevant characteristics of the communication. In some aspects, the determination may be based on a threshold phase noise associated with the MCS or MCS index. For example, referring to FIG. 6, the base station 602 may determine the PTRS allocation within a set of frequencies associated with the communication at 614.

At 912, the base station may output, based on the first indication, a second indication of a number of subcarriers including a PTRS. For example, 912 may be performed by CU processor(s) 1212, DU processor(s) 1232, RU processor (s) 1242, transceiver(s) 1246, antenna(s) 1280, and/or PTRS BW allocation component 199 of FIG. 12. In some aspects, the second indication may further be based on the determination of the PTRS allocation based on the first indication and the MCS (or MCS index) associated with the data signal. The second indication, in some aspects, may be associated with a PDCCH communication related to a data signal to be transmitted. In some aspects, the number of subcarriers may be indicated based on a number or RBs or REGs (e.g., sets of 12 subcarriers) or other unit (e.g., CCE) associated with resources in the frequency domain. The second indication, in some aspects, may further indicate a frequency (or set of frequency domain resources) associated with the number of contiguous subcarriers, e.g., one of a central frequency, a starting frequency, or an ending frequency. For example, referring to FIG. 6, the base station 602 may output, for the UE 604, the PTRS configuration indication 616.

At 914, the base station may output, via one or more symbols, a transmission including a data signal and the PTRS over the number of subcarriers indicated in the second indication. For example, 914 may be performed by CU processor(s) 1212, DU processor(s) 1232, RU processor(s) 1242, transceiver(s) 1246, antenna(s) 1280, and/or PTRS BW allocation component 199 of FIG. 12. In some aspects, the PTRS includes a continuous signal over a set of contiguous symbols (e.g., in a time domain) associated with the data signal. The set of contiguous symbols, in some aspects, may include each symbol also including the data signal. In some aspects, the number of subcarriers is a number of contiguous subcarriers in a frequency domain. For example, referring to FIG. 6, the base station 602 may output, from the UE 604, the communication 618 including the PTRS over the indicated number of subcarriers and the data signal.

In some aspects, the UE may, based on the PTRS received over the number of subcarriers, estimate a phase noise associated with the data signal. In some aspects, the estimation may be performed per OFDM symbol or per symbol (e.g., signal associated with a particular quadrature, or phase, and amplitude representing multiple bits) of the modulated data signal. For example, referring to FIG. 6, the UE 604 may, at 620, perform a phase noise estimation operation on the communication 618. The UE, in some aspects, may, based on the estimated phase noise, perform an adjustment of the received data signal. In some aspects, the adjustment may be performed per OFDM symbol or per symbol (e.g., signal associated with a particular quadrature, or phase, and amplitude representing multiple bits) of the modulated data signal. In some aspects, the adjustment may include one of removing the phase noise from the observed signal based on the estimated phase noise or canceling the phase noise effect of the observed signal based on the estimated phase noise. The adjustment in some aspects, may include a de-convolution function or operation (with the estimated phase noise mask) in the frequency domain. For example, referring to FIG. 6, the UE 604 may, at 620, perform a phase noise cancellation operation on the communication 618.

The UE, in some aspects, may perform a demodulation of the data signal based on the PTRS (e.g., based on the phase noise estimation and cancellation). In some aspects, cancellation described above may be part of the demodulation or may be omitted if the estimated phase noise is used to determine a likelihood of a particular demodulation (e.g., an interpretation of a particular received signal representing a particular symbol). For example, referring to FIG. 6, the UE 604 may, at 620, perform a demodulation of the communication 618. After the demodulation, the UE may transmit, and the base station may receive, a feedback indicating whether the demodulation was successful.

Figure 10:
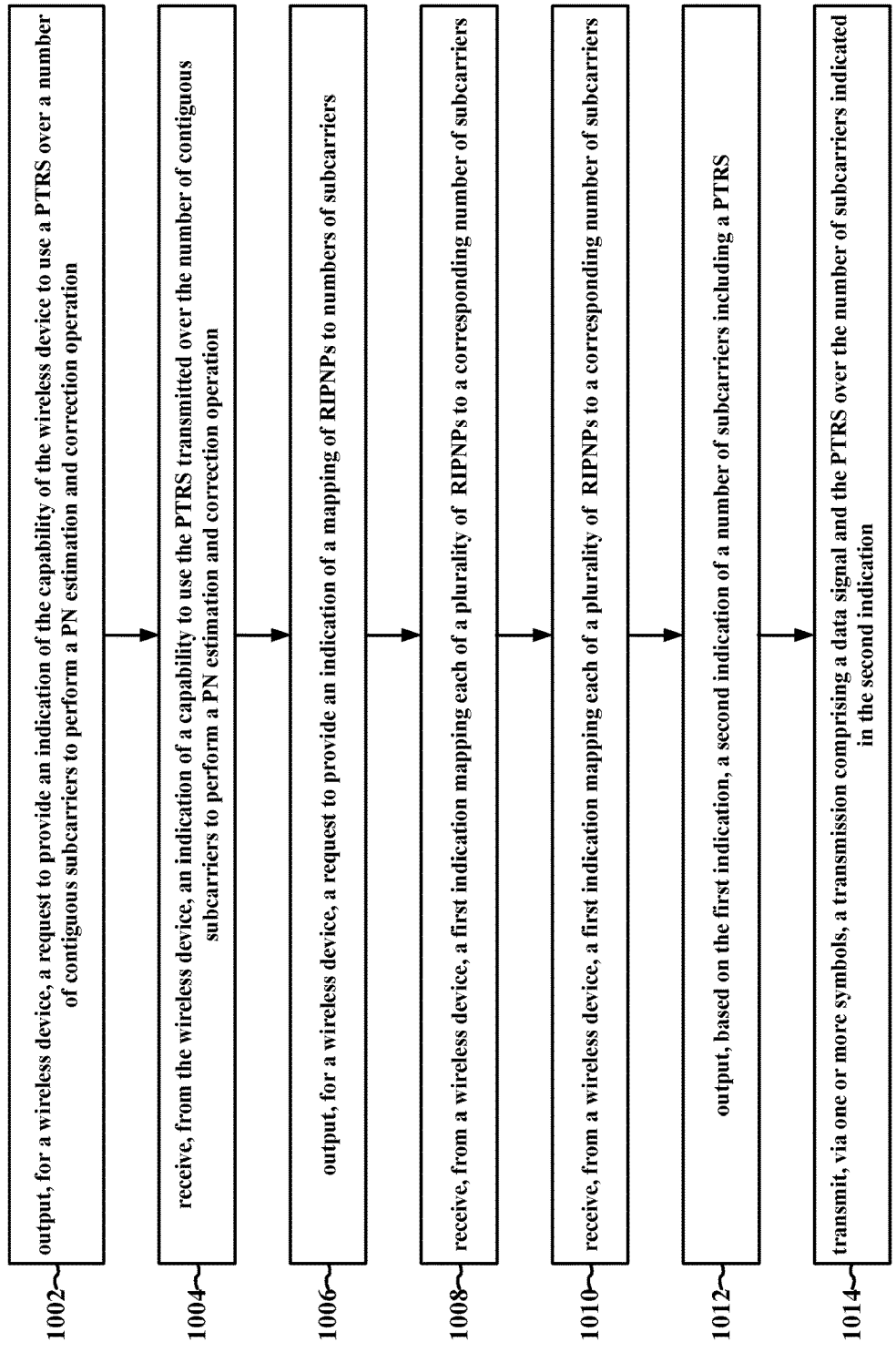
FIG. 10 is a flowchart of a method of wireless communication.

FIG. 10 is a flowchart 1000 of a method of wireless communication. The method may be performed by a network device such as a base station (e.g., the base station 102, 602; the network entity 1102, 1202). At 1002, the base station may output, for a wireless device (e.g., a UE), a request to provide an indication of the capability of the wireless device to use a PTRS over a number of contiguous subcarriers to perform a phase noise estimation and correction operation (e.g., a capability indication). For example, 1002 may be performed by CU processor(s) 1212, DU processor(s) 1232, RU processor(s) 1242, transceiver(s) 1246, antenna(s) 1280, and/or PTRS BW allocation component 199 of FIG. 12. In some aspects, the request to provide the capability indication may be omitted, for example, if the UE is configured to transmit the capability indication without a request. For example, referring to FIG. 6, the base station 602 may output, for the UE 604, the phase noise cancellation capability request 605.

At 1004, the base station may receive, from the wireless device, an indication of a capability to use a PTRS transmitted over a number of contiguous subcarriers to perform a phase noise estimation and correction operation. For example, 1004 may be performed by CU processor(s) 1212, DU processor(s) 1232, RU processor(s) 1242, transceiver(s) 1246, antenna(s) 1280, and/or PTRS BW allocation component 199 of FIG. 12. The capability indication, in some aspects, may be received in response to the request output at 1002 or may be received in the absence of the request as discussed above. Referring to FIG. 6, for example, the base station 602 may receive, and the UE 604 may output, phase noise cancellation capability indication 606 in response to phase noise cancellation capability request 605 or independent of the phase noise cancellation capability request 605.

At 1006, the base station may output, for the wireless device, a request to provide an indication of a mapping of RIPNPs to numbers of subcarriers (e.g., a RIPNP indication). For example, 1006 may be performed by CU processor(s) 1212, DU processor(s) 1232, RU processor(s) 1242, transceiver(s) 1246, antenna(s) 1280, and/or PTRS BW allocation component 199 of FIG. 12. In some aspects, the request may indicate an MCS index table for which to provide the indication of the mapping of RIPNPs to numbers of subcarriers. In some aspects, the request may also indicate a numerology (or SCS) associated with the communication that may be used to determine the mapping of RIPNPs to numbers of subcarriers. For example, referring to FIG. 6, the base station 602 may output, for the UE 604, the RIPNP indication request 608.

At 1008, the base station may receive, from the wireless device, a first indication mapping each of a plurality of RIPNPs to a corresponding number of subcarriers. For example, 1008 may be performed by CU processor(s) 1212, DU processor(s) 1232, RU processor(s) 1242, transceiver(s) 1246, antenna(s) 1280, and/or PTRS BW allocation component 199 of FIG. 12. The first indication, in some aspects, may be associated with MAC layer signaling. The MAC layer signaling, in some aspects, may be associated with attachment to a serving cell or base station. In some aspects, the first indication may include one of information mapping each of the plurality of RIPNPs to the corresponding number of subcarriers or an index identifying one of a plurality of mappings of each of the plurality of RIPNPs to the corresponding number of subcarriers maintained at the network device. The first indication may include the information mapping each of the plurality of RIPNPs to the corresponding number of subcarriers and each mapping may be associated with at least one modulation and coding scheme (MCS) index. For example, referring to FIG. 6, the base station 602 may receive, and the UE 604 may transmit, the RIPNP indication 612 (e.g., an indication that may include a table such as table 650 or other indication of mapping as described above).

At 1010, the base station may, based on the first indication and an MCS (or MCS index) associated with a data signal, determine the number of subcarriers indicated in the second indication. For example, 1010 may be performed by CU processor(s) 1212, DU processor(s) 1232, RU processor(s) 1242, and/or PTRS BW allocation component 199 of FIG. 12. In some aspects, the base station may determine a PTRS allocation (e.g., a PTRS BW) within a set of frequencies (e.g., a BW or BWP) associated with the communication. The PTRS allocation determined at 1010, in some aspects, may further be based on an application type associated with the communication or other relevant characteristics of the communication. In some aspects, the determination may be based on a threshold phase noise associated with the MCS or MCS index. For example, referring to FIG. 6, the base station 602 may determine the PTRS allocation within a set of frequencies associated with the communication at 614.

At 1012, the base station may output, based on the first indication and the determination at 1010, a second indication of a number of subcarriers including a PTRS. For example, 1012 may be performed by CU processor(s) 1212, DU processor(s) 1232, RU processor(s) 1242, transceiver(s) 1246, antenna(s) 1280, and/or PTRS BW allocation component 199 of FIG. 12. The second indication, in some aspects, may be associated with a PDCCH communication related to a data signal to be transmitted. In some aspects, the number of subcarriers may be indicated based on a number or RBs or REGs (e.g., sets of 12 subcarriers) or other unit (e.g., CCE) associated with resources in the frequency domain. The second indication, in some aspects, may further indicate a frequency (or set of frequency domain resources) associated with the number of contiguous subcarriers, e.g., one of a central frequency, a starting frequency, or an ending frequency. For example, referring to FIG. 6, the base station 602 may output, for the UE 604, the PTRS configuration indication 616.

At 1014, the base station may output, via one or more symbols, a transmission including a data signal and the PTRS over the number of subcarriers indicated in the second indication. For example, 1014 may be performed by CU processor(s) 1212, DU processor(s) 1232, RU processor(s) 1242, transceiver(s) 1246, antenna(s) 1280, and/or PTRS BW allocation component 199 of FIG. 12. In some aspects, the PTRS includes a continuous signal over a set of contiguous symbols (e.g., in a time domain) associated with the data signal. The set of contiguous symbols, in some aspects, may include each symbol also including the data signal. In some aspects, the number of subcarriers is a number of contiguous subcarriers in a frequency domain. For example, referring to FIG. 6, the base station 602 may output, from the UE 604, the communication 618 including the PTRS over the indicated number of subcarriers and the data signal.

In some aspects, the UE may, based on the PTRS received over the number of subcarriers, estimate a phase noise associated with the data signal. In some aspects, the estimation may be performed per OFDM symbol or per symbol (e.g., signal associated with a particular quadrature, or phase, and amplitude representing multiple bits) of the modulated data signal. For example, referring to FIG. 6, the UE 604 may, at 620, perform a phase noise estimation operation on the communication 618. The UE, in some aspects, may, based on the estimated phase noise, perform an adjustment of the received data signal. In some aspects, the adjustment may be performed per OFDM symbol or per symbol (e.g., signal associated with a particular quadrature, or phase, and amplitude representing multiple bits) of the modulated data signal. In some aspects, the adjustment may include one of removing the phase noise from the observed signal based on the estimated phase noise or canceling the phase noise effect of the observed signal based on the estimated phase noise. The adjustment in some aspects, may include a de-convolution function or operation (with the estimated phase noise mask) in the frequency domain. For example, referring to FIG. 6, the UE 604 may, at 620, perform a phase noise cancellation operation on the communication 618.

The UE, in some aspects, may perform a demodulation of the data signal based on the PTRS (e.g., based on the phase noise estimation and cancellation). In some aspects, cancellation described above may be part of the demodulation or may be omitted if the estimated phase noise is used to determine a likelihood of a particular demodulation (e.g., an interpretation of a particular received signal representing a particular symbol). For example, referring to FIG. 6, the UE 604 may, at 620, perform a demodulation of the communication 618. After the demodulation, the UE may transmit, and the base station may receive, a feedback indicating whether the demodulation was successful.

Figure 11:
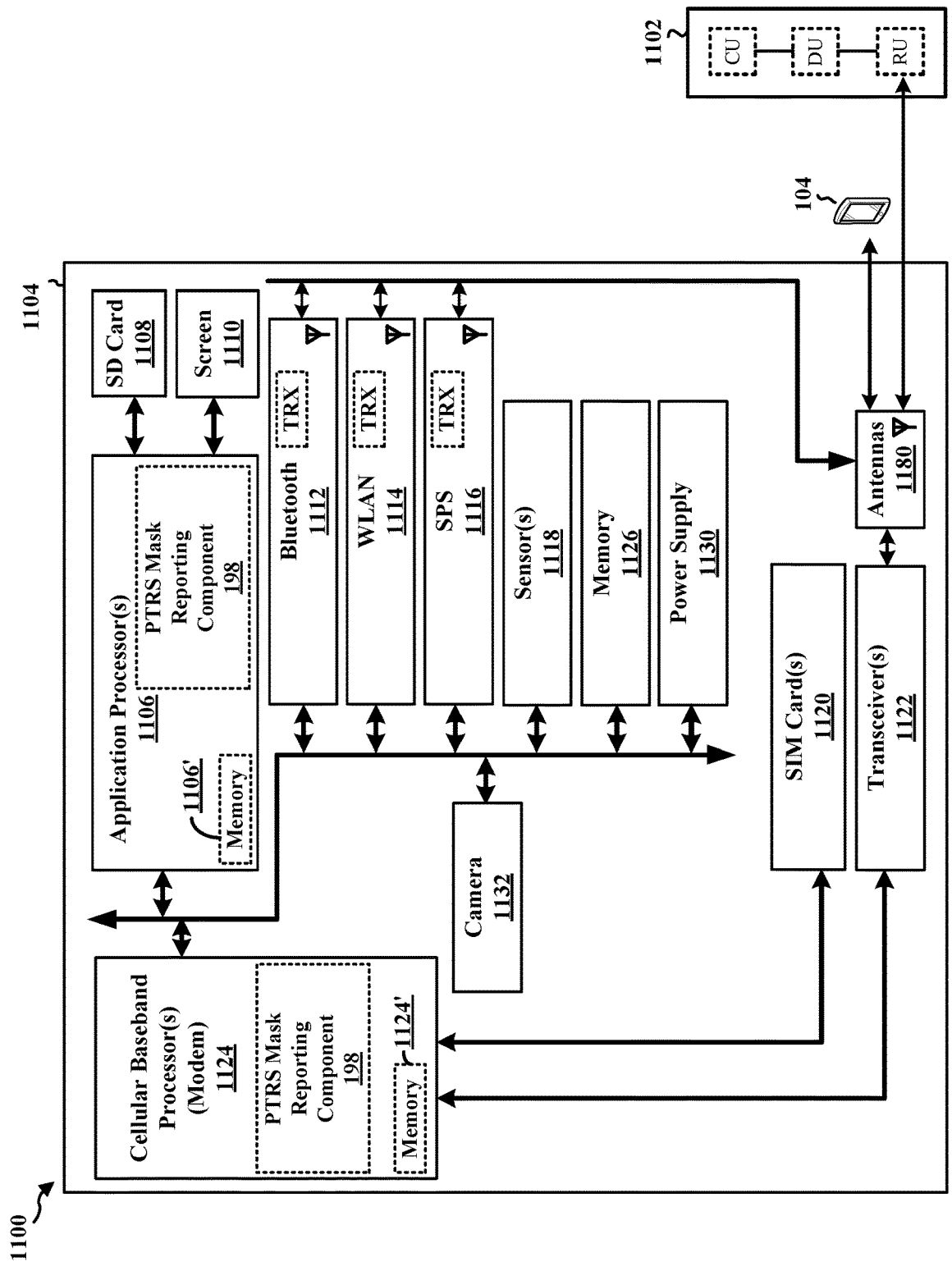
FIG. 11 is a diagram illustrating an example of a hardware implementation for an apparatus.

FIG. 11 is a diagram 1100 illustrating an example of a hardware implementation for an apparatus 1104. The apparatus 1104 may be a UE, a component of a UE, or may implement UE functionality. In some aspects, the apparatus 1104 may include at least one cellular baseband processor 1124 (also referred to as a modem) coupled to one or more transceivers 1122 (e.g., cellular RF transceiver). The cellular baseband processor(s) 1124 may include at least one on-chip memory 1124'. In some aspects, the apparatus 1104 may further include one or more subscriber identity modules (SIM) cards 1120 and at least one application processor 1106 coupled to a secure digital (SD) card 1108 and a screen 1110. The application processor(s) 1106 may include on-chip memory 1106'. In some aspects, the apparatus 1104 may further include a Bluetooth module 1112, a WLAN module 1114, an SPS module 1116 (e.g., GNSS module), one or more sensor modules 1118 (e.g., barometric pressure sensor/ altimeter; motion sensor such as inertial measurement unit (IMU), gyroscope, and/or accelerometer(s); light detection and ranging (LIDAR), radio assisted detection and ranging (RADAR), sound navigation and ranging (SONAR), magnetometer, audio and/or other technologies used for positioning), additional memory modules 1126, a power supply 1130, and/or a camera 1132. The Bluetooth module 1112, the WLAN module 1114, and the SPS module 1116 may include an on-chip transceiver (TRX) (or in some cases, just a receiver (RX)). The Bluetooth module 1112, the WLAN module 1114, and the SPS module 1116 may include their own dedicated antennas and/or utilize one or more antennas 1180 for communication. The cellular baseband processor(s) 1124 communicates through the transceiver(s) 1122 via the one or more antennas 1180 with the UE 104 and/or with an RU associated with a network entity 1102. The cellular baseband processor(s) 1124 and the application processor(s) 1106 may each include a computer-readable medium/ memory 1124', 1106', respectively. The additional memory modules 1126 may also be considered a computer-readable medium/memory. Each computer-readable medium/ memory 1124', 1106', 1126 may be non-transitory. The cellular baseband processor(s) 1124 and the application processor(s) 1106 are each responsible for general processing, including the execution of software stored on the computer-readable medium/memory. The software, when executed by the cellular baseband processor(s) 1124/application processor(s) 1106, causes the cellular baseband processor(s) 1124/application processor(s) 1106 to perform the various functions described supra. The computer-readable medium/memory may also be used for storing data that is manipulated by the cellular baseband processor(s) 1124/ application processor(s) 1106 when executing software. The cellular baseband processor(s) 1124/application processor(s) 1106 may be a component of the UE 350 and may include the at least one memory 360 and/or at least one of the TX processor 368, the RX processor 356, and the controller/ processor 359. In one configuration, the apparatus 1104 may be at least one processor chip (modem and/or application) and include just the cellular baseband processor(s) 1124 and/or the application processor(s) 1106, and in another configuration, the apparatus 1104 may be the entire UE (e.g., see UE 350 of FIG. 3) and include the additional modules of the apparatus 1104.

As discussed supra, the PTRS mask reporting component 198 may be configured to transmit, for a network device, a first indication mapping a RIPNP to a corresponding number of subcarriers, receive, based on the first indication, a second indication of a number of subcarriers including a PTRS, receive, via one or more symbols, a transmission including a data signal and the PTRS over the number of subcarriers indicated in the second indication, and perform a demodulation of the data signal using a phase noise estimation based on the PTRS. The PTRS mask reporting component 198 may be within the cellular baseband processor(s) 1124, the application processor(s) 1106, or both the cellular baseband processor(s) 1124 and the application processor(s) 1106. The PTRS mask reporting component 198 may be one or more hardware components specifically configured to carry out the stated processes/algorithm, implemented by one or more processors configured to perform the stated processes/algorithm, stored within a computer-readable medium for implementation by one or more processors, or some combination thereof. When multiple processors are implemented, the multiple processors may perform the stated processes/algorithm individually or in combination. As shown, the apparatus 1104 may include a variety of components configured for various functions. In one configuration, the apparatus 1104, and in particular the cellular baseband processor(s) 1124 and/or the application processor(s) 1106, may include means for transmitting, for a network device, a first indication mapping each of a plurality of RIPNPs to a corresponding number of subcarriers. The apparatus 1104, and in particular the cellular baseband processor(s) 1124 and/or the application processor(s) 1106, in some aspects, may include means for receiving, based on the first indication, a second indication of a number of subcarriers including a PTRS. The apparatus 1104, and in particular the cellular baseband processor(s) 1124 and/or the application processor(s) 1106, in some aspects, may include means for receiving, via one or more symbols, a transmission including a data signal and the PTRS over the number of subcarriers indicated in the second indication. The apparatus 1104, and in particular the cellular baseband processor(s) 1124 and/or the application processor(s) 1106, in some aspects, may include means for performing a demodulation of the data signal using a phase noise estimation based on the PTRS. The apparatus 1104, and in particular the cellular baseband processor(s) 1124 and/or the application processor(s) 1106, in some aspects, may include means for estimating a phase noise associated with the data signal, based on the PTRS received over the number of subcarriers. The apparatus 1104, and in particular the cellular baseband processor(s) 1124 and/or the application processor(s) 1106, in some aspects, may include means for performing an adjustment of the received data signal based on the estimated phase noise. The apparatus 1104, and in particular the cellular baseband processor(s) 1124 and/or the application processor(s) 1106, in some aspects, may include means for transmitting, for the network device, a third indication of a capability to use the PTRS transmitted over the number of contiguous subcarriers to perform a phase noise estimation and correction operation. The apparatus 1104, and in particular the cellular baseband processor(s) 1124 and/or the application processor(s) 1106, in some aspects, may include means for receiving, from the network device, a request to provide the third indication of the capability to use the PTRS over the number of contiguous subcarriers to perform a phase noise estimation and correction operation. The apparatus 1104, and in particular the cellular baseband processor(s) 1124 and/or the application processor(s) 1106, in some aspects, may include means for receiving, from the network device, a request to provide the first indication. The means may be the PTRS mask reporting component 198 of the apparatus 1104 configured to perform the functions recited by the means. As described supra, the apparatus 1104 may include the TX processor 368, the RX processor 356, and the controller/processor 359. As such, in one configuration, the means may be the TX processor 368, the RX processor 356, and/or the controller/processor 359 configured to perform the functions recited by the means or as described in relation to FIGS. 7 and 8.

Figure 12:
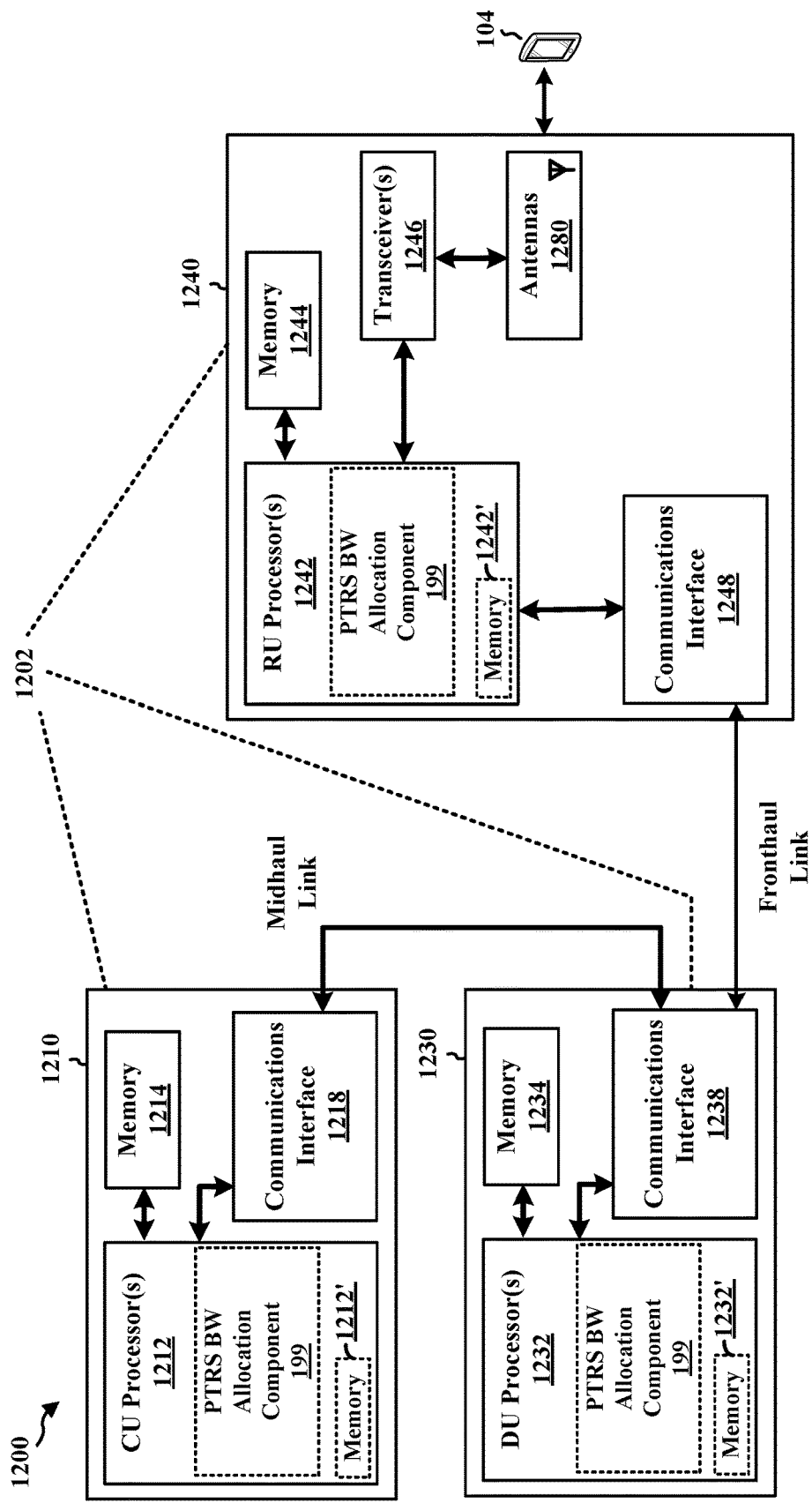
FIG. 12 is a diagram illustrating an example of a hardware implementation for a network entity.

FIG. 12 is a diagram 1200 illustrating an example of a hardware implementation for a network entity 1202. The network entity 1202 may be a BS, a component of a BS, or may implement BS functionality. The network entity 1202 may include at least one of a CU 1210, a DU 1230, or an RU 1240. For example, depending on the layer functionality handled by the PTRS BW allocation component 199, the network entity 1202 may include the CU 1210; both the CU 1210 and the DU 1230; each of the CU 1210, the DU 1230, and the RU 1240; the DU 1230; both the DU 1230 and the RU 1240; or the RU 1240. The CU 1210 may include at least one CU processor 1212. The CU processor(s) 1212 may include on-chip memory 1212'. In some aspects, the CU 1210 may further include additional memory modules 1214 and a communications interface 1218. The CU 1210 communicates with the DU 1230 through a midhaul link, such as an F1 interface. The DU 1230 may include at least one DU processor 1232. The DU processor(s) 1232 may include on-chip memory 1232'. In some aspects, the DU 1230 may further include additional memory modules 1234 and a communications interface 1238. The DU 1230 communicates with the RU 1240 through a fronthaul link. The RU 1240 may include at least one RU processor 1242. The RU processor(s) 1242 may include on-chip memory 1242'. In some aspects, the RU 1240 may further include additional memory modules 1244, one or more transceivers 1246, one or more antennas 1280, and a communications interface 1248. The RU 1240 communicates with the UE 104. The on-chip memory 1212', 1232', 1242' and the additional memory modules 1214, 1234, 1244 may each be considered a computer-readable medium/memory. Each computer-readable medium/memory may be non-transitory. Each of the processors 1212, 1232, 1242 is responsible for general processing, including the execution of software stored on the computer-readable medium/memory. The software, when executed by the corresponding processor(s) causes the processor(s) to perform the various functions described supra. The computer-readable medium/memory may also be used for storing data that is manipulated by the processor(s) when executing software.

As discussed supra, the PTRS BW allocation component 199 may be configured to obtain, from a wireless device, a first indication mapping each of a plurality of RIPNPs to a corresponding number of subcarriers, output, based on the first indication, a second indication of a number of subcarriers including a PTRS, and transmit, via one or more symbols, a transmission including a data signal and the PTRS over the number of subcarriers indicated in the second indication. The PTRS BW allocation component 199 may be within one or more processors of one or more of the CU 1210, DU 1230, and the RU 1240. The PTRS BW allocation component 199 may be one or more hardware components specifically configured to carry out the stated processes/algorithm, implemented by one or more processors configured to perform the stated processes/algorithm, stored within a computer-readable medium for implementation by one or more processors, or some combination thereof. When multiple processors are implemented, the multiple processors may perform the stated processes/algorithm individually or in combination. The network entity 1202 may include a variety of components configured for various functions. In one configuration, the network entity 1202 may include means for obtaining, from a wireless device, a first indication mapping each of a plurality of RIPNPs to a corresponding number of subcarriers. The network entity 1202 may include means for outputting, based on the first indication, a second indication of a number of subcarriers including a PTRS. The network entity 1202 may include means for transmitting, via one or more symbols, a transmission including a data signal and the PTRS over the number of subcarriers indicated in the second indication. The network entity 1202 may include means for determining, based on the first indication and a MCS associated with the associated data signal, the number of subcarriers indicated in the second indication. The network entity 1202 may include means for outputting, for the wireless device, a request to provide the third indication of the capability to use the PTRS over the number of contiguous subcarriers to perform a phase noise estimation and correction operation. The network entity 1202 may include means for receiving, from the wireless device, a third indication of a capability to use the PTRS transmitted over the number of contiguous subcarriers to perform a phase noise estimation and correction operation. The network entity 1202 may include means for outputting, for the network device, a request to provide the first indication. The means may be the PTRS BW allocation component 199 of the network entity 1202 configured to perform the functions recited by the means. As described supra, the network entity 1202 may include the TX processor 316, the RX processor 370, and the controller/processor 375. As such, in one configuration, the means may be the TX processor 316, the RX processor 370, and/or the controller/processor 375 configured to perform the functions recited by the means or as described in relation to FIGS. 9 and 10.

Various aspects relate generally to a method to improve the allocation of PTRS BW by using device-specific phase noise mask information. Some aspects more specifically relate to transmitting an indication of a UE-specific phase noise mask to a network node and receiving an indication of a number of subcarriers including a PTRS and the PTRS for phase noise estimation and cancellation. In some examples, the wireless device may transmit, and a network device may receive, a first indication mapping a RIPNP to a corresponding number of subcarriers (e.g., a UE-specific mapping). The network node may transmit, and the wireless device may receive, a second indication of a number of subcarriers including a PTRS based on the first indication. The network node may transmit, and the wireless device may receive, the PTRS over the number of subcarriers indicated in the second indication for estimating a phase noise for one or more symbols of an associated data signal.

Particular aspects of the subject matter described in this disclosure can be implemented to realize one or more of the following potential advantages. In some examples, by indicating the UE-specific phase noise mask (e.g., the mapping of the RIPNP to the corresponding number of subcarriers for the wireless device or UE), the described techniques can be used to optimize the allocation of resources to PTRS transmission. In some aspects, the optimized allocation may introduce a minimized overhead associated with the PTRS and allow the receiving device to minimize resources and/or energy used to perform a phase noise estimation and correction operation.

It is understood that the specific order or hierarchy of blocks in the processes/flowcharts disclosed is an illustration of example approaches. Based upon design preferences, it is understood that the specific order or hierarchy of blocks in the processes/flowcharts may be rearranged. Further, some blocks may be combined or omitted. The accompanying method claims present elements of the various blocks in a sample order, and are not limited to the specific order or hierarchy presented.

The previous description is provided to enable any person skilled in the art to practice the various aspects described herein. Various modifications to these aspects will be readily apparent to those skilled in the art, and the generic principles defined herein may be applied to other aspects. Thus, the claims are not limited to the aspects described herein, but are to be accorded the full scope consistent with the language claims. Reference to an element in the singular does not mean "one and only one" unless specifically so stated, but rather "one or more." Terms such as "if," "when," and "while" do not imply an immediate temporal relationship or reaction. That is, these phrases, e.g., "when," do not imply an immediate action in response to or during the occurrence of an action, but simply imply that if a condition is met then an action will occur, but without requiring a specific or immediate time constraint for the action to occur. The word "exemplary" is used herein to mean "serving as an example, instance, or illustration." Any aspect described herein as "exemplary" is not necessarily to be construed as preferred or advantageous over other aspects. Unless specifically stated otherwise, the term "some" refers to one or more. Combinations such as "at least one of A, B, or C," "one or more of A, B, or C," "at least one of A, B, and C," "one or more of A, B, and C," and "A, B, C, or any combination thereof" include any combination of A, B, and/or C, and may include multiples of A, multiples of B, or multiples of C. Specifically, combinations such as "at least one of A, B, or C," "one or more of A, B, or C," "at least one of A, B, and C," "one or more of A, B, and C," and "A, B, C, or any combination thereof" may be A only, B only, C only, A and B, A and C, B and C, or A and B and C, where any such combinations may contain one or more member or members of A, B, or C. Sets should be interpreted as a set of elements where the elements number one or more. Accordingly, for a set of X, X would include one or more elements. When at least one processor is configured to perform a set of functions, the at least one processor, individually or in any combination, is configured to perform the set of functions. Accordingly, each processor of the at least one processor may be configured to perform a particular subset of the set of functions, where the subset is the full set, a proper subset of the set, or an empty subset of the set. A processor may be referred to as processor circuitry. A memory/memory module may be referred to as memory circuitry. If a first apparatus receives data from or transmits data to a second apparatus, the data may be received/transmitted directly between the first and second apparatuses, or indirectly between the first and second apparatuses through a set of apparatuses. A device configured to "output" data, such as a transmission, signal, or message, may transmit the data, for example with a transceiver, or may send the data to a device that transmits the data. A device configured to "obtain" data, such as a transmission, signal, or message, may receive, for example with a transceiver, or may obtain the data from a device that receives the data. Information stored in a memory includes instructions and/or data. All structural and functional equivalents to the elements of the various aspects described throughout this disclosure that are known or later come to be known to those of ordinary skill in the art are expressly incorporated herein by reference and are encompassed by the claims. Moreover, nothing disclosed herein is dedicated to the public regardless of whether such disclosure is explicitly recited in the claims. The words "module," "mechanism," "element," "device," and the like may not be a substitute for the word "means." As such, no claim element is to be construed as a means plus function unless the element is expressly recited using the phrase "means for."

As used herein, the phrase "based on" shall not be construed as a reference to a closed set of information, one or more conditions, one or more factors, or the like. In other words, the phrase "based on A" (where "A" may be information, a condition, a factor, or the like) shall be construed as "based at least on A" unless specifically recited differently.

The following aspects are illustrative only and may be combined with other aspects or teachings described herein, without limitation.

Aspect 1 is a method of wireless communication at a wireless device, comprising: transmitting, for a network device, a first indication mapping each of a plurality of residual integrated phase noise powers (RIPNPs) to a corresponding number of subcarriers; receiving, based on the first indication, a second indication of a number of subcarriers including a phase tracking reference signal (PTRS); receiving, via one or more symbols, a transmission comprising a data signal and the PTRS over the number of subcarriers indicated in the second indication; and performing a demodulation of the data signal using a phase noise estimation based on the PTRS.

Aspect 2 is the method of aspect 1, further comprising: estimating a phase noise associated with the data signal, based on the PTRS received over the number of subcarriers; and performing an adjustment of the received data signal based on the estimated phase noise, wherein the demodulation of the data signal is based on the data signal after the adjustment.

Aspect 3 is the method of any of aspects 1 and 2, wherein the second indication is associated with a physical downlink control channel (PDCCH) communication related to the data signal.

Aspect 4 is the method of any of aspects 1 to 3, wherein the PTRS comprises a continuous signal over a set of contiguous symbols associated with the data signal.

Aspect 5 is the method of any of aspects 1 to 4, wherein the number of subcarriers is a number of contiguous subcarriers in a frequency domain.

Aspect 6 is the method of aspect 5, wherein the second indication further indicates a frequency associated with the number of contiguous subcarriers.

Aspect 7 is the method of any of aspects 5 and 6, further comprising: transmitting, for the network device, a third indication of a capability to use the PTRS transmitted over the number of contiguous subcarriers to perform a phase noise estimation and correction operation.

Aspect 8 is the method of aspect 7, further comprising: receiving, from the network device, a request to provide the third indication of the capability to use the PTRS over the number of contiguous subcarriers to perform a phase noise estimation and correction operation, wherein the third indication is transmitted based on receiving the request.

Aspect 9 is the method of any of aspects 7 and 8, further comprising: receiving, from the network device, a request to provide the first indication, wherein the first indication is transmitted based on receiving the request.

Aspect 10 is the method of any of aspects 1 to 9, wherein the first indication is associated with medium access control (MAC) layer signaling.

Aspect 11 is the method of aspect 10, wherein the MAC layer signaling is associated with attachment to a serving cell.

Aspect 12 is the method of any of aspects 1 to 11, wherein the first indication comprises one of information mapping each of the plurality of RIPNPs to the corresponding number of subcarriers or an index identifying one of a plurality of mappings of each of the plurality of RIPNPs to the corresponding number of subcarriers maintained at the network device.

Aspect 13 is the method of aspect 12, wherein the first indication comprises the information mapping each of the plurality of RIPNPs to the corresponding number of subcarriers and each mapping is associated with at least one modulation and coding scheme (MCS) index.

Aspect 14 is a method of wireless communication at a network device, comprising: obtaining, from a wireless device, a first indication mapping each of a plurality of residual integrated phase noise powers (RIPNPs) to a corresponding number of subcarriers; outputting, based on the first indication, a second indication of a number of subcarriers including a phase tracking reference signal (PTRS); and transmitting, for estimating a phase noise for one or more symbols of an associated data signal at the wireless device, the PTRS over the number of subcarriers indicated in the second indication.

Aspect 15 is the method of aspect 14, wherein the second indication is associated with a physical downlink control channel (PDCCH) communication related to the associated data signal.

Aspect 16 is the method of any of aspects 14 and 15, wherein the PTRS comprises a continuous signal over a set of contiguous symbols associated with the associated data signal.

Aspect 17 is the method of any of aspects 14 to 16, wherein the number of subcarriers is a number of contiguous subcarriers in a frequency domain.

Aspect 18 is the method of aspect 17, wherein the second indication further indicates a frequency associated with the number of contiguous subcarriers.

Aspect 19 is the method of any of aspects 17 and 18, further comprising: receiving, from the wireless device, a third indication of a capability to use the PTRS transmitted over the number of contiguous subcarriers to perform a phase noise estimation and correction operation.

Aspect 20 is the method of aspect 19, further comprising: outputting, for the wireless device, a request to provide the third indication of the capability to use the PTRS over the number of contiguous subcarriers to perform a phase noise estimation and correction operation, wherein the third indication is received based on receiving the request.

Aspect 21 is the method of any of aspects 14 to 20, further comprising: receiving, from the network device, a request to provide the first indication, wherein the first indication is transmitted based on receiving the request.

Aspect 22 is the method of any of aspects 14 to 21, wherein the first indication is associated with medium access control (MAC) layer signaling.

Aspect 23 is the method of aspect 22, wherein the MAC layer signaling is associated with an attachment to a serving cell.

Aspect 24 is the method of any of aspects 14 to 23, wherein the first indication comprises one of information mapping each of the plurality of RIPNPs to the corresponding number of subcarriers or an index identifying one of a plurality of mappings of each of the plurality of RIPNPs to the corresponding number of subcarriers maintained at the network device.

Aspect 25 is the method of aspect 24, wherein the first indication comprises the information mapping each of the plurality of RIPNPs to the corresponding number of subcarriers and each mapping is associated with at least one modulation and coding scheme (MCS) index.

Aspect 26 is the method of any of aspects 14 to 25, further comprising: determining, based on the first indication and a modulation and coding scheme (MCS) associated with the associated data signal, the number of subcarriers indicated in the second indication.

Aspect 27 is an apparatus for wireless communication at a device including a memory and at least one processor coupled to the memory and, based at least in part on information stored in the memory, the at least one processor is configured to implement any of aspects 1 to 13.

Aspect 28 is the apparatus of aspect 27, further including a transceiver or an antenna coupled to the at least one processor.

Aspect 29 is an apparatus for wireless communication at a device including means for implementing any of aspects 1 to 13.

Aspect 30 is a computer-readable medium (e.g., a non-transitory computer-readable medium) storing computer executable code, where the code when executed by a processor causes the processor to implement any of aspects 1 to 13.

Aspect 31 is an apparatus for wireless communication at a device including a memory and at least one processor coupled to the memory and, based at least in part on information stored in the memory, the at least one processor is configured to implement any of aspects 14 to 26.

Aspect 32 is the apparatus of aspect 31, further including a transceiver or an antenna coupled to the at least one processor.

Aspect 33 is an apparatus for wireless communication at a device including means for implementing any of aspects 14 to 26.

Aspect 34 is a computer-readable medium (e.g., a non-transitory computer-readable medium) storing computer executable code, where the code when executed by a processor causes the processor to implement any of aspects 14 to 26.

What is claimed is:
1. An apparatus for wireless communication at a wireless device, comprising:
at least one memory; and
at least one processor coupled to the at least one memory and, based at least in part on stored information that is stored in the at least one memory, the at least one processor, individually or in any combination, is configured to:
transmit, for a network device, a first indication mapping each of a plurality of residual integrated phase noise powers (RIPNPs) to a corresponding number of subcarriers;
receive, based on the first indication, a second indication of a number of subcarriers including a phase tracking reference signal (PTRS);
receive, via one or more symbols, a transmission comprising a data signal and the PTRS over the number of subcarriers indicated in the second indication; and
performing a demodulation of the data signal using a phase noise estimation based on the PTRS.

2. The apparatus of claim 1, wherein the at least one processor, individually or in any combination, is further configured to:
estimate a phase noise associated with the data signal, based on the PTRS received over the number of subcarriers; and
perform an adjustment of the received data signal based on the phase noise estimation, wherein the at least one processor, individually or in any combination, is configured to perform the demodulation of the data signal based on the data signal after the adjustment.

3. The apparatus of claim 1, wherein the second indication is associated with a physical downlink control channel (PDCCH) communication related to the data signal.

4. The apparatus of claim 1, wherein the PTRS comprises a continuous signal over a set of contiguous symbols associated with the data signal.

5. The apparatus of claim 1, wherein the number of subcarriers is a number of contiguous subcarriers in a frequency domain.

6. The apparatus of claim 5, wherein the second indication further indicates a frequency associated with the number of contiguous subcarriers.

7. The apparatus of claim 5, wherein the at least one processor, individually or in any combination, is further configured to:
transmit, for the network device, a third indication of a capability to use the PTRS transmitted over the number of contiguous subcarriers to perform a phase noise estimation and correction operation.

8. The apparatus of claim 7, wherein the at least one processor, individually or in any combination, is further configured to:
receive, from the network device, a request to provide the third indication of the capability to use the PTRS over the number of contiguous subcarriers to perform the phase noise estimation and correction operation, wherein the at least one processor, individually or in any combination, is configured to transmit the third indication based on receiving the request.

9. The apparatus of claim 7, wherein the at least one processor, individually or in any combination, is further configured to:
receive, from the network device, a request to provide the first indication, wherein the at least one processor, individually or in any combination, is configured to transmit the first indication based on receiving the request.

10. The apparatus of claim 1, wherein the first indication is associated with medium access control (MAC) layer signaling.

11. The apparatus of claim 10, wherein the MAC layer signaling is associated with attachment to a serving cell.

12. The apparatus of claim 1, wherein the first indication comprises one of information mapping each of the plurality of RIPNPs to the corresponding number of subcarriers or an index identifying one of a plurality of mappings of each of the plurality of RIPNPs to the corresponding number of subcarriers maintained at the network device.

13. The apparatus of claim 12, wherein the first indication comprises the information mapping each of the plurality of RIPNPs to the corresponding number of subcarriers and each mapping is associated with at least one modulation and coding scheme (MCS) index.

14. An apparatus for wireless communication at a network device, comprising:
at least one memory; and
at least one processor coupled to the at least one memory and, based at least in part on stored information that is stored in the at least one memory, the at least one processor, individually or in any combination, is configured to:
obtain, from a wireless device, a first indication mapping each of a plurality of residual integrated phase noise powers (RIPNPs) to a corresponding number of subcarriers;
output, based on the first indication, a second indication of a number of subcarriers including a phase tracking reference signal (PTRS); and
transmit, via one or more symbols, a transmission comprising a data signal and the PTRS over the number of subcarriers indicated in the second indication.

15. The apparatus of claim 14, wherein the second indication is associated with a physical downlink control channel (PDCCH) communication related to the data signal.

16. The apparatus of claim 14, wherein the PTRS comprises a continuous signal over a set of contiguous symbols associated with the data signal.

17. The apparatus of claim 14, wherein the number of subcarriers is a number of contiguous subcarriers in a frequency domain.

18. The apparatus of claim 17, wherein the second indication further indicates a frequency associated with the number of contiguous subcarriers.

19. The apparatus of claim 17, wherein the at least one processor, individually or in any combination, is further configured to:
receive, from the wireless device, a third indication of a capability to use the PTRS transmitted over the number of contiguous subcarriers to perform a phase noise estimation and correction operation.

20. The apparatus of claim 19, wherein the at least one processor, individually or in any combination, is further configured to:
output, for the wireless device, a request to provide the third indication of the capability to use the PTRS over the number of contiguous subcarriers to perform the phase noise estimation and correction operation, wherein the at least one processor, individually or in any combination, is configured to receive the third indication based on receiving the request.

21. The apparatus of claim 14, wherein the at least one processor, individually or in any combination, is further configured to:
output, for the wireless device, a request to provide the first indication, wherein the at least one processor, individually or in any combination, is configured to receive the first indication based on receiving the request.

22. The apparatus of claim 14, wherein the first indication is associated with medium access control (MAC) layer signaling.

23. The apparatus of claim 22, wherein the MAC layer signaling is associated with an attachment to a serving cell.

24. The apparatus of claim 14, wherein the first indication comprises one of information mapping each of the plurality of RIPNPs to the corresponding number of subcarriers or an index identifying one of a plurality of mappings of each of the plurality of RIPNPs to the corresponding number of subcarriers maintained at the network device.

25. The apparatus of claim 24, wherein the first indication comprises the information mapping each of the plurality of RIPNPs to the corresponding number of subcarriers and each mapping is associated with at least one modulation and coding scheme (MCS) index.

26. The apparatus of claim 14, wherein the at least one processor, individually or in any combination, is further configured to:
determine, based on the first indication and a modulation and coding scheme (MCS) associated with the data signal, the number of subcarriers indicated in the second indication.

27. A method of wireless communication at a wireless device, comprising:
transmitting, for a network device, a first indication mapping each of a plurality of residual integrated phase noise powers (RIPNPs) to a corresponding number of subcarriers;
receiving, based on the first indication, a second indication of a number of subcarriers including a phase tracking reference signal (PTRS);
receiving, via one or more symbols, a transmission comprising a data signal and the PTRS over the number of subcarriers indicated in the second indication; and
performing a demodulation of the data signal using a phase noise estimation based on the PTRS.

28. The method of claim 27, further comprising:
estimating a phase noise associated with the data signal, based on the PTRS received over the number of subcarriers; and
performing an adjustment of the received data signal based on the phase noise estimation, wherein the demodulation of the data signal is based on the data signal after the adjustment.

29. A method of wireless communication at a network device, comprising:
obtaining, from a wireless device, a first indication mapping each of a plurality of residual integrated phase noise powers (RIPNPs) to a corresponding number of subcarriers;
outputting, based on the first indication, a second indication of a number of subcarriers including a phase tracking reference signal (PTRS); and
transmitting, via one or more symbols, a transmission comprising a data signal and the PTRS over the number of subcarriers indicated in the second indication.

30. The method of claim 29, further comprising:
determining, based on the first indication and a modulation and coding scheme (MCS) associated with the data signal, the number of subcarriers indicated in the second indication.

* * * * *